(12) United States Patent
Ganguly et al.

(10) Patent No.: US 12,705,111 B2
(45) Date of Patent: Aug. 11, 2026

(54) TIGHTLY COUPLED PARALLEL APPLICATIONS ON A SERVERLESS COMPUTING SYSTEM

(71) Applicant: Amazon Technologies, Inc., Seattle, WA (US)

(72) Inventors: Arijit Ganguly, Kirkland, WA (US); Prashant Kumar Singh, Seattle, WA (US); Ravi S Nagayach, Aurora, IL (US)

(73) Assignee: Amazon Technologies, Inc., Seattle, WA (US)

( * ) Notice: Subject to any disclaimer, the term of this patent is extended or adjusted under 35 U.S.C. 154(b) by 654 days.

(21) Appl. No.: 17/657,327

(22) Filed: Mar. 30, 2022

(65) Prior Publication Data

US 2023/0315541 A1 Oct. 5, 2023

(51) Int. Cl.

*G06F 9/54* (2006.01)
*G06F 9/48* (2006.01)
*G06F 9/50* (2006.01)

(52) U.S. Cl.

CPC .............. *G06F 9/54* (2013.01); *G06F 9/4881* (2013.01); *G06F 9/5044* (2013.01)

(58) Field of Classification Search

CPC ......... G06F 9/54; G06F 9/4881; G06F 9/5044

(Continued)

(56) References Cited

U.S. PATENT DOCUMENTS 6,044,394 A * 3/2000 Cadden ............... G06F 9/45512 718/107
6,044,650 A 4/2000 Cook et al.

(Continued)

FOREIGN PATENT DOCUMENTS

CN 113300985 A 8/2021
EP 4500331 A1 2/2025

(Continued)

OTHER PUBLICATIONS

Zhang, Weihua & Sun, Gengxin & Bin, Sheng. "A Novel Task Communication and Scheduling Algorithm for NoC-based MPSoC." International Journal of Smart Home., vol. 9, p. 179-188. (Year: 2015).*

(Continued)

*Primary Examiner* — Pierre Vital
*Assistant Examiner* — Jordan Scott Motter
(74) *Attorney, Agent, or Firm* — Knobbe, Martens, Olson & Bear, LLP

(57) ABSTRACT

Systems and methods are described for executing tightly coupled parallel applications on a serverless computing system. A serverless computing system executes user-submitted code in sandboxed environments such as virtual machines or containers. To support execution of parallel applications that require data transfer between instances of the application, the serverless computing system implements an ephemeral mesh network that allows instances of the parallel application to communicate with each other while executing in their respective sandboxes. In some embodiments, a controller or parent application may also connect to the ephemeral mesh network to coordinate execution of the parallel applications. In other embodiments, the parent application may be external to the serverless computing system. The serverless computing system may connect and disconnect sandboxed environments from the ephemeral mesh network as parallel applications start and stop executing, and may remove the network and terminate the parallel applications when the parent application stops executing.

22 Claims, 12 Drawing Sheets

(58) Field of Classification Search
USPC .......................................................... 718/102
See application file for complete search history.

(56) References Cited

U.S. PATENT DOCUMENTS 7,739,233 B1 6/2010 Ghemawat et al.
7,885,204 B1 2/2011 Schongar et al.
9,070,211 B1* 6/2015 Kroeger .................. G06T 11/00
9,323,556 B2 4/2016 Wagner
10,127,601 B2 11/2018 Milne et al.
10,295,268 B2 5/2019 Schryver et al.
10,397,189 B1 8/2019 Hashmi
11,068,888 B1 7/2021 Levatte et al.
11,144,359 B1 10/2021 Brooker et al.
11,409,864 B1* 8/2022 Baker ..................... G06F 21/53
11,611,616 B1 3/2023 Gabrielson et al.
12,340,261 B2 6/2025 Ganguly et al.
2005/0022086 A1 1/2005 Kotz et al.
2007/0258508 A1* 11/2007 Werb .................... H04L 9/3247 375/140
2008/0056191 A1 3/2008 Heinonen et al.
2008/0315624 A1 12/2008 Claffy
2010/0146085 A1 6/2010 Van Wie et al.
2011/0078703 A1* 3/2011 Dokovski ........... G06F 16/9562 719/315
2013/0109314 A1 5/2013 Kneckt et al.
2016/0330107 A1* 11/2016 Thubert .............. H04L 49/1584
2016/0350564 A1 12/2016 Nedelcu
2016/0378554 A1* 12/2016 Gummaraju .......... G06F 9/5011 718/104
2017/0329528 A1 11/2017 Wei et al.
2018/0302807 A1* 10/2018 Chen ................. H04W 72/1263
2019/0332366 A1 10/2019 Natanzon et al.
2020/0036796 A1 1/2020 Tollet et al.
2020/0052982 A1* 2/2020 Nainar .................. G06F 9/4843
2020/0068369 A1* 2/2020 Liao ........................ H04W 4/06
2020/0089528 A1* 3/2020 Gutierrez ................ G06F 9/546
2020/0137125 A1 4/2020 Patnala et al.
2020/0145920 A1 5/2020 Shen et al.
2020/0184556 A1 6/2020 Cella
2020/0344610 A1 10/2020 Duo et al.
2021/0097193 A1 4/2021 Miller et al.
2021/0208948 A1* 7/2021 Sagi ................... G06Q 30/0609
2021/0358032 A1 11/2021 Cella et al.
2021/0373861 A1* 12/2021 Parthasarathy ..... H04L 41/5058
2021/0377157 A1 12/2021 Zhao et al.
2021/0389983 A1* 12/2021 Blue ....................... G06F 9/465
2021/0406088 A1 12/2021 Chen
2022/0035905 A1* 2/2022 Lu ........................... G06F 21/56
2022/0103570 A1 3/2022 Nainar et al.
2024/0031309 A1 1/2024 Wu et al.

FOREIGN PATENT DOCUMENTS

WO 2009/143342 A2 11/2009
WO 2022/206229 A1 10/2022
WO 2023/192308 A1 10/2023

OTHER PUBLICATIONS

Zhang, Weihua & Sun, Gengxin, & Bin, Sheng. "A Novel Task Communication and Scheduling Algorithm for NoC-based MPSoC." ( Year: 2015).*

Ashima Agarwal, Live Migration of Virtual Machines in Cloud. (Year: 2012).

Fatima Hussain, Intelligent Service Mesh Framework for API Security and Management. (Year: 2019).

International Preliminary Report on Patentability re PCT Application No. PCT/US2023/016609, dated Oct. 10, 2024.

International Search Report and Written Opinion, re PCT Application No. PCT/US2023/016609, dated Jul. 5, 2023.

Jeremy A. Hansen, Extending Mesh Networks to Opportunistic Resource Sharing (Year: 2012).

Sanjay et al., A strategy for scheduling tightly coupled parallel applications on clusters, Concurrency and Computation: Practice and Experience, 21 :2491-2517 (Year: 2009).

Thomas Mundt, Network Topology Analysis in the Cloud. (Year: 2011).

* cited by examiner

TIGHTLY COUPLED PARALLEL APPLICATIONS ON A SERVERLESS COMPUTING SYSTEM

BACKGROUND

Computing devices can utilize communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, hosted computing environments or data processing centers, generally referred to herein as "data centers," may include a number of interconnected computing systems to provide computing resources to users of the data center. The data centers may be private data centers operated on behalf of an organization, or public data centers operated on behalf of, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computing resources from a data center, such as single computing devices or a configuration of networked computing devices, and be provided with varying numbers of virtual machine resources.

In some scenarios, a user can request that a data center provide computing resources to execute a particular task. The task may correspond to a set of computer-executable instructions, which the data center may then execute on behalf of the user. The data center may thus further facilitate increased utilization of data center resources.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
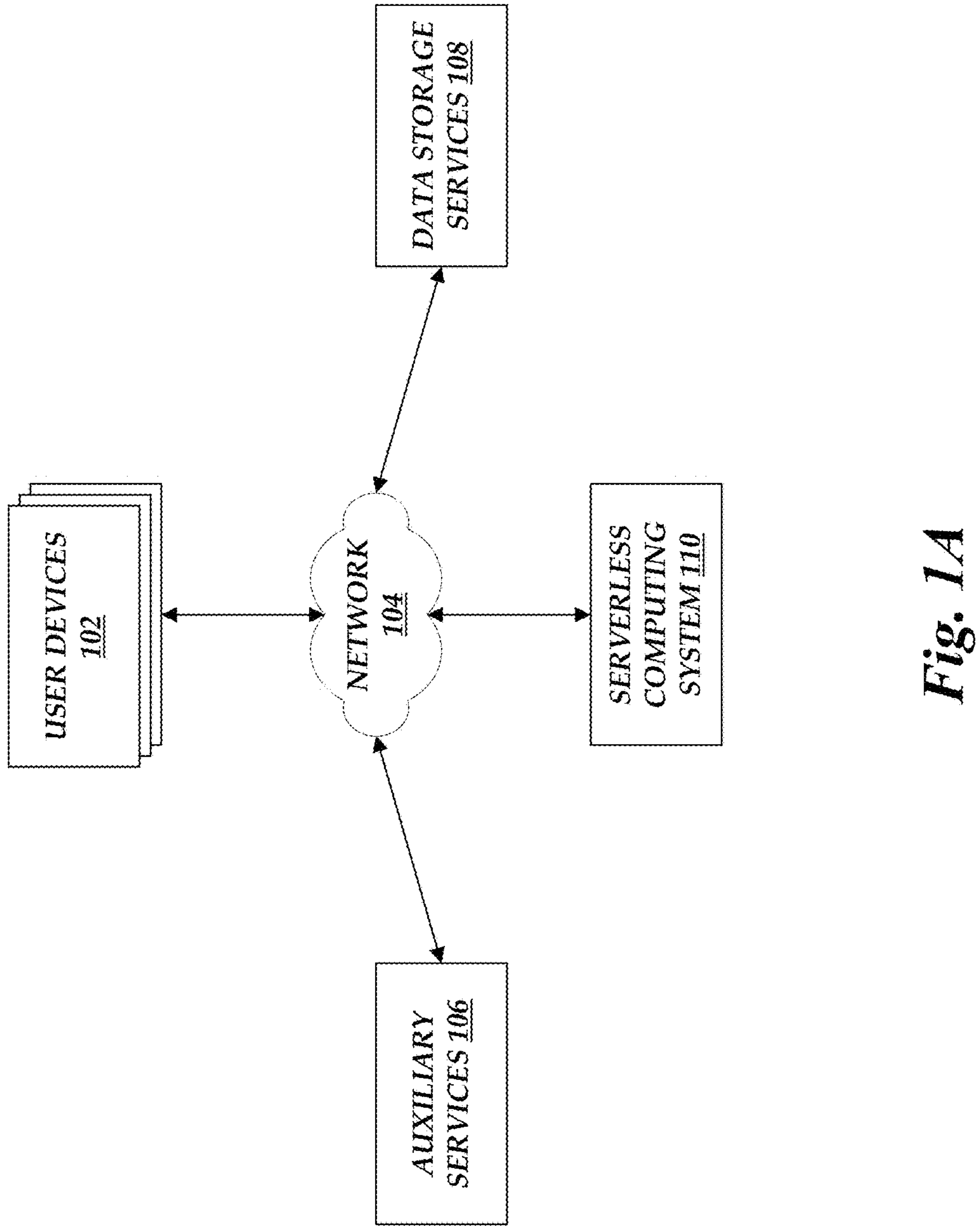
FIGS. 1A and 1B are block diagrams depicting an example operating environment in which a serverless computing system can execute tasks corresponding to code, which may be submitted by users of the serverless computing system, and can create and manage ephemeral clusters and ephemeral mesh networks in accordance with aspects of the present disclosure.
Figure 1A:

Generally described, aspects of the present disclosure relate to a serverless computing system. More specifically, aspects of the present disclosure relate to improving the performance of a serverless computing system at executing tightly coupled parallel computing applications. As described in detail herein, the serverless computing system may provide a network-accessible service enabling users to submit or designate computer-executable code to be executed by virtual machine instances on the serverless computing system. Each set of code on the serverless computing system may define a "task," and may implement specific functionality corresponding to that task when executed on a virtual machine instance of the serverless computing system. Individual implementations of the task on the serverless computing system may be referred to as an "execution" of the task (or a "task execution"). In some embodiments, a user may execute several instances of a task on a serverless computing system to implement a parallel computing application, which may process large amounts of data by dividing the data into smaller amounts and distributing it to tasks that execute in parallel and process their respective portions of the data. In further embodiments, these parallel tasks may require coordination or communication between instances of the task. Applications that require such coordination or communication may be referred to herein as "tightly coupled" parallel applications.

In a serverless computing system, however, it may be difficult for tasks executing in parallel to communicate with each other, and thus it may be difficult to implement a tightly coupled parallel computing application on a serverless computing system. For example, a serverless computing system may execute tasks in "sandboxed" computing environments (as described in more detail below) that are not allowed to communicate directly with each other for security reasons. As a further example, tasks executing in parallel on a serverless computing system may have the ability to communicate, but may not have mechanisms for discovering each other or announcing their existence. Still further, in some embodiments, the serverless computing system may implement networking or distribute tasks in a manner that would make communication between tasks inefficient. Users of a serverless computing environment may implement workarounds that allow the tasks of a tightly coupled parallel application to exchange data, but such workarounds are typically implemented on servers external to the serverless computing environment, which introduces latency and overhead and thus reduces the benefit of using a serverless computing system to implement tightly coupled parallel applications.

To address these issues, an operator of a serverless computing system may implement an ephemeral cluster manager as described herein. The ephemeral cluster manager, in some embodiments, may allow users to create and maintain ephemeral clusters of sandboxed computing environments within a serverless computing system, and these ephemeral clusters may communicate between sandboxed environments using an ephemeral mesh network that enables low-latency communication between the tasks executing in the environments. In some embodiments, the ephemeral cluster manager may allow a task executing on the serverless computing system to "fork" child tasks, and may assign the child tasks created in this manner (and, in some embodiments, the parent task) addresses on an ephemeral mesh network that enables discovery and communication. In other embodiments, the ephemeral cluster manager may allow a controller process (which may execute as a task on the serverless computing system, or as a process on a computing device that is external to the serverless computing system) to create child tasks by making calls to a request interface of the serverless computing system, as described in more detail below. The ephemeral cluster manager may thus improve the performance of the serverless computing system when executing tasks in parallel that require inter-task communication, and thus improve the performance of the serverless computing system when executing tightly coupled parallel applications.

The serverless computing system can enable users to trigger execution of a task based on a variety of potential events, such as detecting new data at a network-based storage system, transmission of an application programming interface ("API") call to the serverless computing system, or transmission of a specially formatted hypertext transport protocol ("HTTP") packet to the serverless computing system. Thus, users may utilize the serverless computing system to execute any specified executable code "on-demand," without requiring configuration or maintenance of the underlying hardware or infrastructure on which the code is executed. Further, the serverless computing system may be configured to execute tasks in a rapid manner (e.g., in under 100 milliseconds), thus enabling execution of tasks in "real-time" (e.g., with little or no perceptible delay to an end user).

The serverless computing system may thus allow users to execute code in a serverless computing environment (e.g., one in which the underlying server is not under user control). The term "serverless computing environment," as used herein, is intended to refer to an environment in which responsibility for managing generation, configuration, and state of an underlying execution environment is abstracted away from a user, such that the user need not, for example, create the execution environment, install an operating system within the execution environment, or manage a state of the environment in order to execute desired code in the environment. Similarly, the term "server-based computing environment" is intended to refer to an environment in which a user is at least partly responsible for managing generation, configuration, or state of an underlying execution environment in addition to executing desired code in the environment. One skilled in the art will thus appreciate that "serverless" and "server-based" may indicate the degree of user control over execution environments in which code is executed, rather than the actual absence or presence of a server.

As described in more detail below, the serverless computing system may include a worker manager configured to receive user code (threads, programs, etc., composed in any of a variety of programming languages) and execute the code in a highly scalable, low latency manner, without requiring user configuration of a virtual machine instance. Specifically, the worker manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the worker manager receives user-initiated requests to execute code, and identifies a pre-configured virtual machine instance to execute the code based on configuration information associated with the request. The worker manager can further allocate the identified virtual machine instance to execute the user's code at least partly by creating and configuring containers inside the allocated virtual machine instance, and provisioning the containers with code of the task as well as any dependency code objects. Various embodiments for implementing a worker manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well.

While a virtual machine instance executing an operating system is described herein as one example of an execution environment, other execution environments are also possible. For example, tasks or other processes may be executed within a software "container," which provides an isolated runtime environment without itself providing virtualization of hardware. Containers may be implemented within virtual machines to provide additional security, or may be run outside of a virtual machine instance.

As will be appreciated by one of skill in the art in light of the present disclosure, the embodiments disclosed herein improves the ability of computing systems, such as on-demand code execution systems, to execute code in an efficient manner. Moreover, the presently disclosed embodiments address technical problems inherent within computing systems; specifically, the problems of managing latency and other performance issues that arise when tasks executing in parallel on a serverless computing environment need to communicate with each other. These problems are more pervasive in a serverless computing system because, as described above, the details of "where" a task is executing have been abstracted away from the user, such that the user cannot easily program a task that discovers and communicates with other tasks executing in other sandboxed environments within the serverless computing environment. These technical problems are addressed by the various technical solutions described herein, including the provisioning of an ephemeral cluster manager within a serverless computing system to facilitate the creation and management of ephemeral mesh networks to which parallel computing tasks are added and removed dynamically as the tasks are executed. The technical solutions further provide users with a number of options for creating child tasks, such as forking child tasks from a parent task or invoking a request interface to create child tasks, that provide different technical improvements for different needs. For example, parent tasks that need to exchange data with child tasks during their respective executions may opt for a fork/join implementation that allows the parent task to communicate via the ephemeral mesh network. As a further example, controller processes that need to "outlive" individual tasks executing on a serverless computing system may be implemented on an external computing device, thereby allowing a user to implement a tightly coupled parallel application with a long-lived controller process. The present disclosure represents a number of improvements on existing data processing systems and computing systems in general.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

FIG. 1A is a block diagram of an example operating environment 100 in which a serverless computing system 110 may operate based on communication with user computing devices 102, auxiliary services 106, and network-based data storage services 108. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The serverless computing system 110 may provide the user computing devices 102 with one or more user interfaces, command-line interfaces (CLIs), application programing interfaces (APIs), and/or other programmatic interfaces for generating and uploading user-executable code (including metadata identifying dependency code objects for the uploaded code), invoking the user-provided code (e.g., submitting a request to execute the user code on the serverless computing system 110), scheduling event-based jobs or timed jobs, tracking the user-provided code, and/or viewing other logging or monitoring information related to their requests and/or user code. Although one or more embodiments may be described herein as using a user interface, it should be appreciated that such embodiments may, additionally or alternatively, use any CLIs, APIs, or other programmatic interfaces.

The illustrative environment 100 further includes one or more network-based data storage services 108, which are configured to enable the serverless computing system 110 to store and retrieve data from one or more persistent or substantially persistent data sources. Illustratively, the network-based data storage services 108 may enable the serverless computing system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the serverless computing system 110 to query for and retrieve information regarding data stored within the serverless computing system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the serverless computing system 110 via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA)

network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In the example of FIG. 1A, the serverless computing system 110 is illustrated as connected to the network 104. In some embodiments, any of the components within the serverless computing system 110 can communicate with other components of the serverless computing system 110 via the network 104. In other embodiments, not all components of the serverless computing system 110 are capable of communicating with other components of the operating environment 100. In one example, only the frontend 120 depicted in FIG. 1B (which may in some instances represent multiple frontends 120) may be connected to the network 104, and other components of the serverless computing system 110 may communicate with other components of the environment 100 via the frontends 120. Additionally, in some embodiments, some or all of the environments in which user-submitted code executes (as described in more detail below) may be isolated from each other for purposes of security, efficiency, or other reasons.

In FIG. 1A, users, by way of user computing devices 102, may interact with the serverless computing system 110 to provide executable code, and establish rules or logic defining when and how such code should be executed on the serverless computing system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the serverless computing system 110, and request that the serverless computing system 110 execute the code. The serverless computing system 110 can handle the acquisition and configuration of compute capacity (e.g., containers, instances, etc., which are described in greater detail below) based on the code execution request, and execute the code using the compute capacity. The serverless computing system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying). In accordance with embodiments of the present disclosure, and as described in more detail below, the serverless computing system 110 may configure the virtual machine instances with customized operating systems to execute the user's code more efficiency and reduce utilization of computing resources.

Figure 1B:
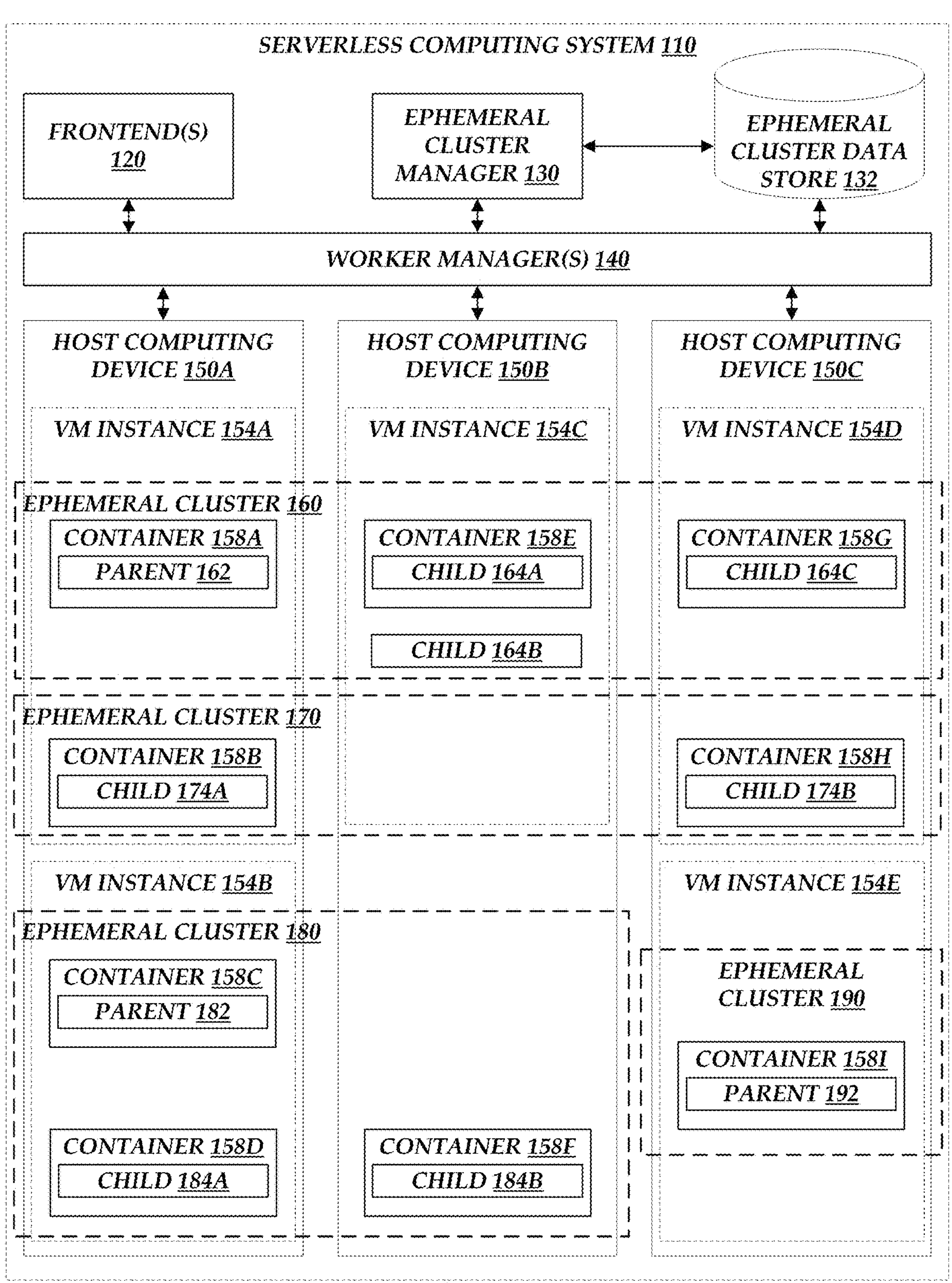

With reference now to FIG. 1B, the serverless computing system 110 is depicted as operating in a distributed computing environment including several computer systems that are interconnected using one or more computer networks (not shown in FIG. 1B). The serverless computing system 110 could also operate within a computing environment having a fewer or greater number of devices than are illustrated in FIG. 1B. Thus, the depiction of the serverless computing system 110 in FIG. 1B should be taken as illustrative and not limiting to the present disclosure. For example, the serverless computing system 110 or various constituents thereof could implement various Web services components, hosted or "cloud" computing environments, and/or peer to peer network configurations to implement at least a portion of the processes described herein.

Further, the serverless computing system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

To enable interaction with the serverless computing system 110, the system 110 includes one or more frontends 120, which enable interaction with the serverless computing system 110. In an illustrative embodiment, the frontends 120 serve as a "front door" to the other services provided by the serverless computing system 110, enabling users (via user computing devices 102) to provide, request execution of, and view results of computer executable code. The frontends 120 include a variety of components to enable interaction between the serverless computing system 110 and other computing devices. For example, each frontend 120 may include a request interface providing user computing devices 102 with the ability to upload or otherwise communication user-specified code to the serverless computing system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task instances," "task executions," or simply "instances" or "executions." Tasks may be written, by way of non-limiting example, in JavaScript (e.g., node.js), Java, Python, and/or Ruby (and/or another programming language). Tasks may be "triggered" for execution on the serverless computing system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the serverless computing system 110) prior to the request being received by the serverless computing system 110. As noted above, the code for a task may reference additional code objects maintained at the serverless computing system 110 by use of identifiers of those code objects, such that the code objects are combined with the code of a task in an execution environment prior to execution of the task. The serverless computing system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

A call to execute a task may specify one or more third-party libraries (including native libraries) to be used along with the user code corresponding to the task. In one embodiment, the call may provide to the serverless computing system 110 a file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the serverless computing system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the serverless computing system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the serverless computing system 110 to access private resources (e.g., on a private network). In some embodiments, individual code objects may also be associated with permissions or authorizations. For example, a third party may submit a code object and designate the object as readable by only a subset of users. The serverless computing system 110 may include functionality to enforce these permissions or authorizations with respect to code objects.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the serverless computing system 110 may inspect the call and look for the flag or the header, and if it is present, the serverless computing system 110 may modify the behavior (e.g., logging facilities) of the container in which the task is executed, and cause the output data to be provided back to the user. In some embodiments, the behavior/mode indicators are added to the call by the user interface provided to the user by the serverless computing system 110. Other features such as source code profiling, remote debugging, etc. may also be enabled or disabled based on the indication provided in a call.

To manage requests for code execution, the frontend 120 can include an execution queue (not shown in FIG. 1B), which can maintain a record of requested task executions. Illustratively, the number of simultaneous task executions by the serverless computing system 110 is limited, and as such, new task executions initiated at the serverless computing system 110 (e.g., via an API call, via a call from an executed or executing task, etc.) may be placed on the execution queue and processed, e.g., in a first-in-first-out order. In some embodiments, the serverless computing system 110 may include multiple execution queues, such as individual execution queues for each user account. For example, users of the serverless computing system 110 may desire to limit the rate of task executions on the serverless computing system 110 (e.g., for cost reasons). Thus, the serverless computing system 110 may utilize an account-specific execution queue to throttle the rate of simultaneous task executions by a specific user account. In some instances, the serverless computing system 110 may prioritize task executions, such that task executions of specific accounts or of specified priorities bypass or are prioritized within the execution queue. In other instances, the serverless computing system 110 may execute tasks immediately or substantially immediately after receiving a call for that task, and thus, the execution queue may be omitted.

As noted above, tasks may be triggered for execution at the serverless computing system 110 based on explicit calls from user computing devices 102 (e.g., as received at the request interface). Alternatively or additionally, tasks may be triggered for execution at the serverless computing system 110 based on data retrieved from one or more auxiliary services 106 or network-based data storage services 108. To facilitate interaction with auxiliary services 106, the frontend 120 can include a polling interface (not shown in FIG. 1B), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the serverless computing system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the serverless computing system 110 may in some instances operate to trigger execution of tasks independently. For example, the serverless computing system 110 may operate (based on instructions from a user) to trigger execution of a task at each of a number of specified time intervals (e.g., every 10 minutes).

The frontend 120 can further include an output interface (not shown in FIG. 1B) configured to output information regarding the execution of tasks on the serverless computing system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

In some embodiments, the serverless computing system 110 may include multiple frontends 120. In such embodiments, a load balancer (not shown in FIG. 1B) may be provided to distribute the incoming calls to the multiple frontends 120, for example, in a round-robin fashion. In some embodiments, the manner in which the load balancer distributes incoming calls to the multiple frontends 120 may be based on the location or state of other components of the serverless computing system 110. For example, a load balancer may distribute calls to a geographically nearby frontend 120, or to a frontend with capacity to service the call. In instances where each frontend 120 corresponds to an individual instance of another component of the serverless computing system 110, such as the active pool described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

In the illustrated embodiment, the serverless computing system 110 further includes an ephemeral cluster manager 130, which is described in more detail below. In some embodiments, the ephemeral cluster manager 130 may be a process executing on the worker managers 140 rather than being a separate component of the serverless computing system 140. The ephemeral cluster manager 130 manages creating, updating, and removing ephemeral clusters and ephemeral mesh networks between sandboxed computing environments. As illustrated, the ephemeral cluster manager 130 communicates with an ephemeral cluster data store 132, which stores information regarding ephemeral clusters, ephemeral mesh networks, and sandboxed environments. The ephemeral cluster data store 132 may generally be any non-transient computer-readable data store, such as a hard drive, solid state device, magnetic medium, database, storage service, or other device or service. In some embodiments, the ephemeral cluster data store 132 may be implemented on or as part of the data storage services 108 or auxiliary services 106. In other embodiments, the ephemeral cluster data store 132 may be omitted, and information regarding ephemeral clusters and ephemeral mesh networks may be stored within individual sandboxed computing environments.

To execute tasks, the serverless computing system 110 includes one or more worker managers 140 that manage the instances used for servicing incoming calls to execute tasks. In the example illustrated in FIG. 1B, each worker manager 140 manages an active pool of virtual machine instances 154A-E, which are assigned to one or more users and implemented by one or more physical host computing devices 150A-C. The physical host computing devices 150A-C and the virtual machine instances 154A-E may further implement one or more containers 158A-I, which may contain and execute user-submitted tasks such as parent tasks 162, 182, and 192 and child tasks 164A-C, 174A, 174B, 184A, and 184B. Containers are logical units created within a virtual machine instance, or on a host computing device, using the resources available on that instance or device. For example, each worker manager 140 may, based on information specified in a call to execute a task, create a new container or locate an existing container 158A-I and assign the container to handle the execution of the task. Each container may correspond to an execution environment for the task, providing at least some isolation from other execution environments. For example, each container may provide a file system isolated from other file systems on the device, and code executing in the container may have limited or no access to other file systems or memory space associated with code executing outside of the container.

The containers 156A-I, virtual machine instances 154A-E, and host computing devices 150A-C may further include language runtimes, code libraries, or other supporting functions (not depicted in FIG. 1B) that facilitate execution of user-submitted code 160A-G. The physical computing devices 150A-C and the virtual machine instances 154A-E may further include operating systems, which may be the same operating system, variants of the same operating system, different operating systems, or combinations thereof.

Although the virtual machine instances 154A-E are described here as being assigned to a particular user, in some embodiments, an instance 154A-E may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the serverless computing system 110). In some embodiments, the requests associated with the same user group may share the same containers (e.g., if the user codes associated therewith are identical). In some embodiments, a task does not differentiate between the different users of the group and simply indicates the group to which the users associated with the task belong.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

As shown in FIG. 1B, various combinations and configurations of host computing devices 150A-C, virtual machine instances 154A-E, and containers 158A-I may be used to facilitate execution of user submitted code. In the illustrated example, the host computing device 150A implements three virtual machine instances 154A, 154B, and 154C. Virtual machine instance 154A, in turn, implements two containers 158A and 158B, which contain parent task 162 and child task 174A respectively. Virtual machine instance 154B implements two containers 158C and 158D, which contain parent task 182 and child task 184A respectively. The host computing device 150B further implements a virtual machine instance 154C and directly implements container 158F, which contains child task 184B. The virtual machine instance 154C, in turn, implements container 158E, which contains child task 164A, and directly executes child task 164B. The host computing device 150C implements virtual machine instance 154D, which implements container 158G containing child task 164C. The host computing device 150C further implements virtual machine instance 154E, which implements container 158I containing parent task 192. It will be understood that these embodiments are illustrated for purposes of example, and that many other embodiments are within the scope of the present disclosure.

The host computing devices 150A-C, virtual machine instances 154A-E, and containers 158A-I may generally be referred to herein as "sandboxed environments" or "sandboxes" that implement secure, isolated environments for executing user-submitted code (e.g., the tasks 162, 164A-C, 174A, 174B, 182, 184A, 184B, and 192). These sandboxed environments may, for example, be isolated from each other in terms of networking or communication except by use of the ephemeral mesh networks described below.

The ephemeral cluster manager 130 implements and manages ephemeral clusters 160, 170, 180, and 190, which contain various clusters of sandboxed environments. In the illustrated embodiment, ephemeral cluster 160 includes container 158A (which contains parent task 162), container 158E (which contains child task 164A), the virtual machine instance 154C (which implements child task 164B), and container 158G (which contains child task 164C). Ephemeral cluster 170 includes container 158B and container 158H, which contain child tasks 174A and 174B respectively. Ephemeral cluster 180 includes containers 158C, 158D, and 158F, which contain parent task 182, child task 184A, and child task 184B respectively. Ephemeral cluster 190 includes container 158I, which contains parent task 192. As described in more detail below with reference to FIGS. 1C, 1D, and 1E, the sandboxed environments in these ephemeral clusters 160, 170, 180, and 190 may be connected to each other via ephemeral mesh networks, which may be created and destroyed as parent and child tasks execute. It will again be understood that these embodiments are illustrated for purposes of example, and that many other embodiments are within the scope of the present disclosure.

While some functionalities are generally described herein with reference to an individual component of the serverless computing system 110, other components or a combination of components may additionally or alternatively implement such functionalities. For example, a worker manager 140 may operate to provide some or all of the functionality associated with implementing ephemeral clusters or ephemeral mesh networks as described herein with reference to the ephemeral cluster manager 130.

Figure 1C:
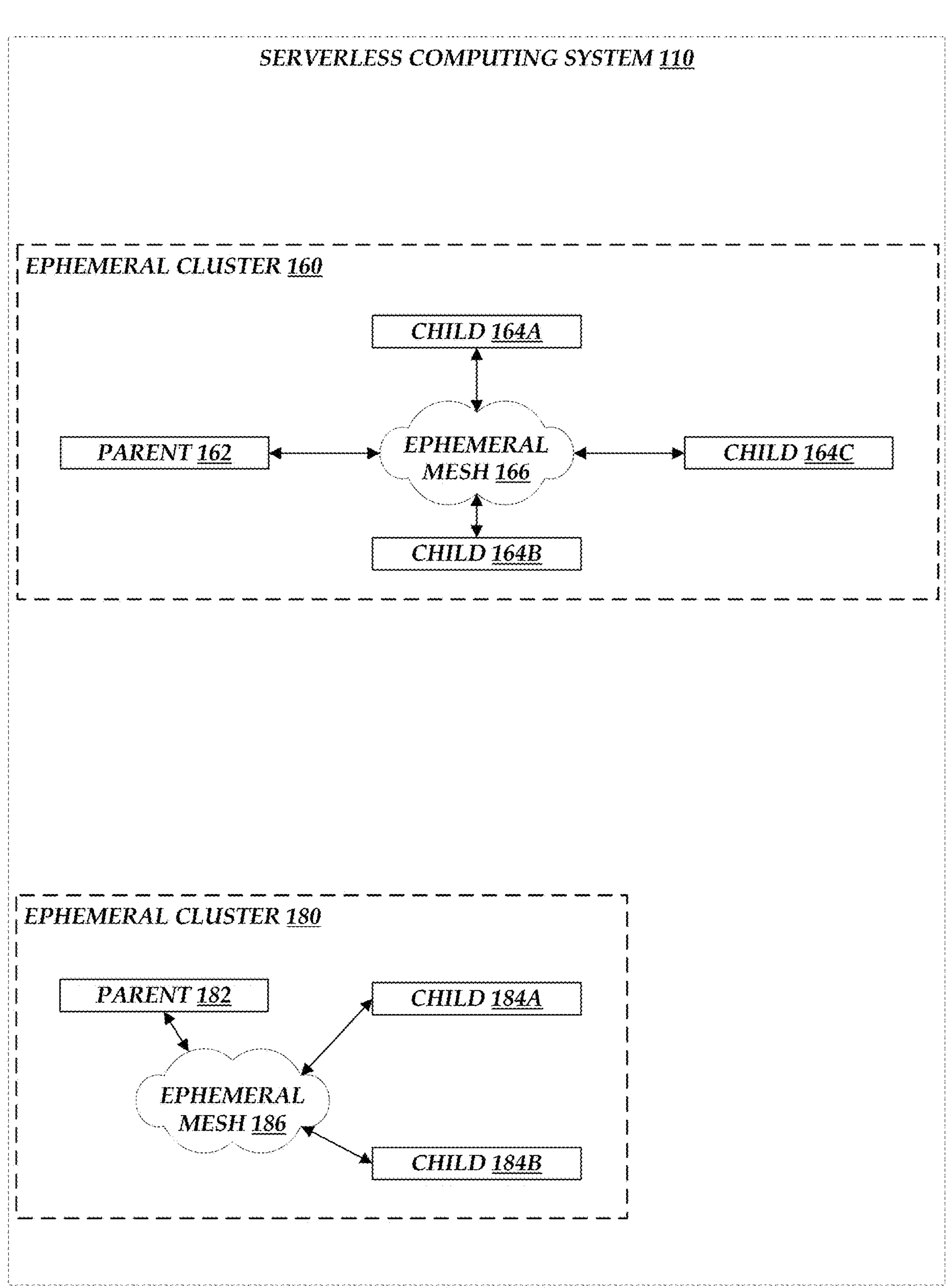
FIGS. 1C, 1D, and 1E are block diagrams depicting example ephemeral clusters and example ephemeral mesh networks in the environment of FIGS. 1A and 1B, in accordance with aspects of the present disclosure.
Figure 1D:
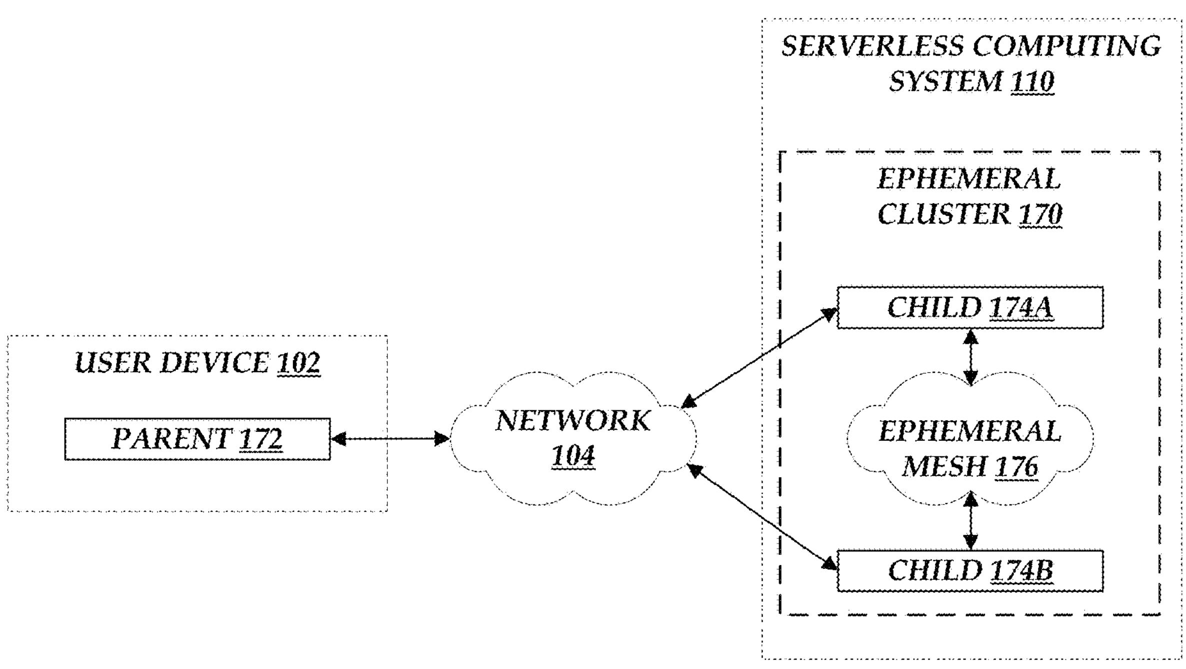
Figure 1E:
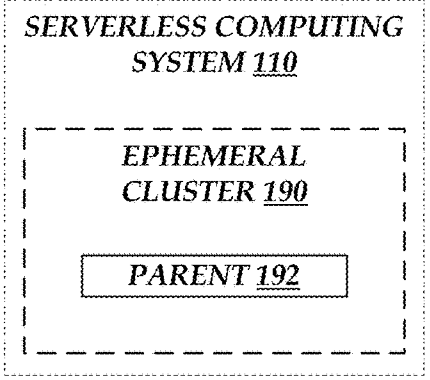

With reference now to FIGS. 1C, 1D, and 1E, examples of ephemeral mesh networks that may be implemented by the ephemeral cluster manager 130 are described. In FIG. 1C, the sandboxed environments in ephemeral cluster 160 are connected by ephemeral mesh network 166, enabling communication between the parent task 162 and child tasks 164A-C. Similarly, the sandboxed environments in ephemeral cluster 180 are connected by ephemeral mesh network 186, enabling communication between the parent task 182 and child tasks 184A and 184B. As described in more detail below, the ephemeral mesh network 166 may be generated and maintained dynamically as child tasks 164A-C begin executing, such that the child tasks 164A, 164B, and 164C are added and removed from the ephemeral mesh network as they begin and end their executions. Similarly, the ephemeral mesh network 168 may be created when child task 184A begins executing (or, in some embodiments, when parent task 182 begins executing), and may continue to exist until parent task 182 ceases execution or until both of the child tasks 184A and 184B cease execution. The ephemeral mesh networks 166 and 186 may be implemented by providing network interfaces, opening ports, assigning Internet Protocol ("IP") addresses, creating or maintaining routing tables, or otherwise configuring the sandboxed environments (e.g., container 158A, virtual machine instance 154C, etc.) in which the parent task 162 and the child tasks 164A-C execute. It will also be understood that, for clarity of illustration, the sandboxed environments themselves are not depicted in FIGS. 1C, 1D, and 1E, although in many embodiments it is the sandboxed environments and not the tasks executing in them that are configured in order to create, manage, and remove the depicted ephemeral mesh networks.

FIG. 1D depicts an embodiment in which a user computing device 102 implements a parent process 172 (which may be referred to herein as a "controller process"), which communicates with child tasks 174A and 174B via the network 104. The child tasks 174A and 174B, in turn, communicate with each other via the ephemeral mesh network 176. As described in more detail below, a parent process 172 external to the serverless computing system (or, in some embodiments, executing as a task in the serverless computing system) may invoke an application programming interface ("API") call to create a child task (e.g., child task 174A or 174B) and connect the child task to an ephemeral mesh network (e.g., ephemeral mesh network 176). In such embodiments, the parent process 172 itself may not be connected to the ephemeral mesh network 176, and may communicate with the child tasks 174A and 174B via an API only.

FIG. 1E depicts an embodiment in which an ephemeral cluster 190 contains only a single sandboxed environment, which is the environment in which parent task 192 executes (i.e., container 158I). Illustratively, an ephemeral cluster such as cluster 190 may be defined or created when a parent task 192 initially executes (i.e., before it has created any child tasks), or when a task executes that does not create any child tasks. In some embodiments, a corresponding ephemeral mesh network may be created at the time the ephemeral cluster 190 is defined, and the sandbox in which parent task 192 executes may be connected to this ephemeral mesh network as its only member. This network may then later be expanded if and when the parent task 192 requests creation of child tasks. In other embodiments, the creation of an ephemeral mesh network may be deferred until there are at least two sandboxes to connect (e.g., after the parent task 192 has created a child task), or may be omitted entirely if the parent task 192 does not create any child tasks. Similarly, in some embodiments, the creation of an ephemeral cluster 190 may be deferred or omitted for a "cluster" that contains only one sandbox. In other embodiments, the ephemeral cluster 190 or a corresponding ephemeral mesh network may be created when the serverless computing system 110 receives the request to execute the parent task 192.

Figure 2A:
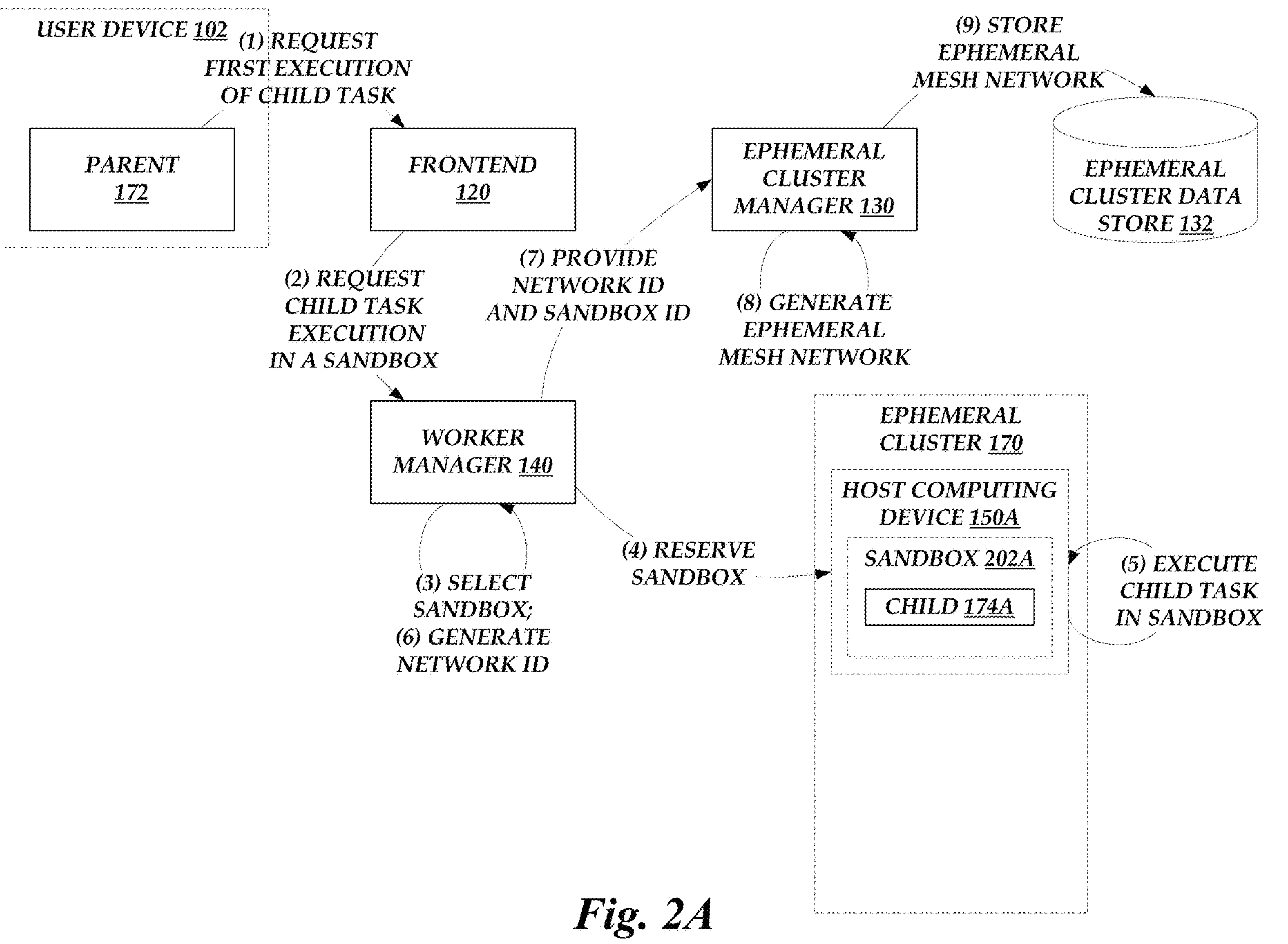
FIGS. 2A and 2B are flow diagrams depicting example interactions for creating and maintaining ephemeral clusters of sandboxed computing environments in a serverless computing system, and creating and maintaining ephemeral mesh networks between the sandboxed computing environments, by processing calls to a request interface of a serverless computing system in accordance with aspects of the present disclosure.
Figure 2B:
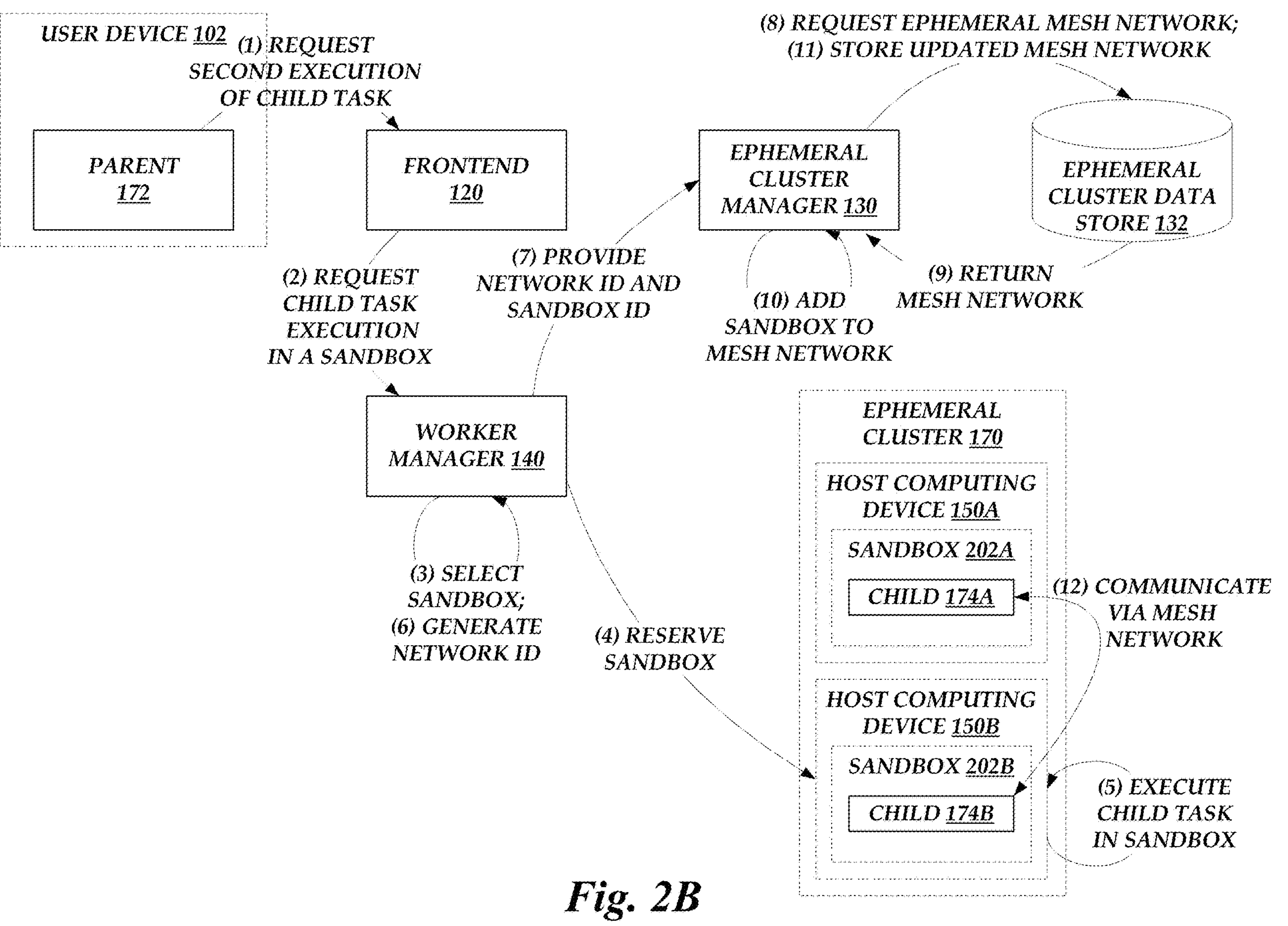

FIGS. 2A and 2B are flow diagrams depicting example interactions for creating and maintaining ephemeral clusters of sandboxed computing environments in a serverless computing system, and creating and maintaining ephemeral mesh networks between the sandboxed computing environments, by processing calls to a request interface of a serverless computing system in accordance with aspects of the present disclosure. As discussed above, the example interactions may allow a serverless computing environment to support faster and more efficient execution of closely coupled parallel computing tasks, by enabling communication between sandboxed environments within the serverless computing environment and removing the need for these tasks to communicate indirectly by sending messages to an external server. With reference now to FIG. 2A, at (1), a parent process 172 executing on a user device 102 may request a first execution of a child task. In some embodiments, the parent process 172 may instead be a task executing on the serverless computing environment rather than a process executing on the user device 102. As described in more detail above, the parent process 172 may request execution of a child task by transmitting a call to the frontend 120. The call may transmitted via a GUI, CLI, API, or other interface of the frontend 120.

In some embodiments, the call transmitted at (1) may include a user-defined mesh network identifier. The user-defined mesh network identifier may illustratively be any string, number, hash, token, key, signature, or other identifier. As described in more detail below, the user-defined mesh network identifier may be combined with other information to form an ephemeral mesh network identifier, which uniquely identifies an ephemeral mesh network on which the child task should be assigned an address, and may serve as a request to create an ephemeral mesh network if none currently exists that corresponds to the user-defined identifier. For example, the user may request execution of a first instance of the child task and may include the identifier "abc123" with the request. In other embodiments, as described in more detail below, an ephemeral mesh network identifier may be generated for the user if the request does not include one. For example, an ephemeral mesh network identifier may be generated based on a user identifier, based on the child task, based on other attributes of the request, user, or task, or generated randomly.

At (2), as described in more detail above, the frontend 120 passes the request to execute the child task to a worker manager 140. The frontend 120 may, in some embodiments, request that the worker manager 140 transmit the ephemeral mesh network identifier and a sandbox identifier for the sandboxed computing environment in which the child task is executed to the ephemeral cluster manager 130. The sandbox identifier may illustratively be a network address assigned to the sandbox, a network address assigned to the physical host computing device or virtual machine instance on which the sandbox resides, or another identifier that can be used to uniquely identify the sandbox. At (3), the worker manager 140 selects (or, in some embodiments, causes the creation of) the sandbox in which the child task will execute.

At (4), the worker manager 140 reserves (or, in some embodiments, causes a host computing device 150A or a virtual machine instance to create) a sandbox 202A in which the child task will execute. In various embodiments, as described in more detail above, the sandbox 202A may be a host computing device (e.g., the host computing device 150A), a virtual machine instance (e.g., the virtual machine instance 154A depicted in FIG. 1B), a container on a host computing device or virtual machine instance (e.g., the container 158B depicted in FIG. 1B), or another sandboxed computing environment. At (5), the child task executes in the sandbox 202A.

At (6), the worker manager 140 generates an ephemeral mesh network identifier from the user-defined identifier and other information. For example, the worker manager 140 may generate an ephemeral mesh network identifier based on the user-defined identifier and user account information, information contained in the request received at (1), a sandbox identifier of the sandbox 202A, or other information. Illustratively, the user-defined identifier may be combined with other information to prevent two users who both request an ephemeral mesh network using the same user-defined identifier (e.g., "abc123") from being connected to the same ephemeral mesh network. At (7), the worker manager 140 transmits the ephemeral mesh network identifier and the sandbox identifier of the sandbox 202A to the ephemeral cluster manager 130. In some embodiments, the worker manager 140 transmits the sandbox identifier to the frontend 120, which then transmits the ephemeral mesh network identifier and relays the sandbox identifier to the ephemeral cluster manager 130.

At (8), in some embodiments, the ephemeral cluster manager 130 generates an ephemeral mesh network corresponding to the ephemeral mesh network identifier, and connects the sandbox 202A to the ephemeral mesh network. Illustratively, the ephemeral cluster manager 130 may determine that the ephemeral mesh network does not already exist by requesting information from the ephemeral cluster data store 132 and receiving a response indicating that no such network exists. In other embodiments, an ephemeral mesh network corresponding to the identifier may already exist, and the ephemeral cluster manager 130 may connect the sandbox 202A to the existing ephemeral mesh network. The ephemeral cluster manager 130 may determine that an ephemeral mesh network with that identifier already exists, for example, by requesting and receiving information from the ephemeral cluster data store 132. In still other embodiments, the ephemeral cluster manager 130 may determine that the sandbox 202A would be the only entity on the ephemeral mesh network if it were created at this time, and thus may defer creation of the ephemeral mesh network until at least two entities would be on the network. It will be understood that an ephemeral cluster may, in some embodiments, be defined as the set of sandboxes that are connected to each other by a particular ephemeral mesh network, and thus the ephemeral mesh network identifier may also serve as an ephemeral cluster identifier. In other embodiments, as described above, creation of an ephemeral mesh network may be deferred until the network is needed (e.g., until there are at least two sandboxes to put on the network), and an ephemeral cluster may be defined as a single sandbox 202A that may (or may not) eventually join an ephemeral mesh network and communicate with other sandboxes. At (9), the ephemeral cluster manager 130 may store information regarding the ephemeral cluster, ephemeral mesh network, and/or the sandbox 202A in an ephemeral cluster data store 132. Such information may include, for example, the ephemeral mesh network identifier, the sandbox identifier, a network address of the identified sandbox 202A, an ephemeral mesh network address assigned to the sandbox 202A, or other such information.

It will be understood that FIG. 2A is provided for purposes of example, and that many variations on the depicted interactions are within the scope of the present disclosure. For example, the interactions at (6), (7), (8), and (9) may be carried out prior to or in parallel with the interactions at (4) and (5). As a further example, the frontend 120 may generate all or part of the ephemeral mesh network identifier (e.g., by appending a user identifier or using a user identifier as the ephemeral mesh network identifier) upon receiving the request at (1). FIG. 2A is thus understood to be illustrative and not limiting.

With reference now to FIG. 2B, example interactions for processing a second request to execute an instance of the child task will be described. At (1), the parent process 172 transmits a second request to the frontend 120 to execute a second instance of the child task. In the second request, the parent process 172 transmits the same user-defined mesh network identifier that was included in the first request. The interactions at (2), (3), (4), and (5) are thus similar to the corresponding interactions depicted in FIG. 2A but with a different sandbox 202B selected and used, and the descriptions of these interactions are not repeated in the interests of brevity. At (6), the worker manager 140 generates the same ephemeral mesh network identifier that was generated in FIG. 2A, based on the same inputs, and at (7) provides the ephemeral mesh network identifier and the sandbox identifier of the newly assigned sandbox 202B to the ephemeral cluster manager 130.

At (8), the ephemeral cluster manager 130 requests information from the ephemeral cluster data store 132 regarding the ephemeral mesh network with the specified identifier, and at (9) the ephemeral cluster data store 132 responds with the requested information. Illustratively, the information may include a list of sandbox identifiers for sandboxes such as sandbox 202A that are already connected to the identified ephemeral mesh network. At (10), the ephemeral cluster manager 130 adds the sandbox 202B to the ephemeral mesh network. As discussed above, adding or connecting the sandbox 202B to the ephemeral mesh network may include creating a network interface on the sandbox 202B, assigning an address to the sandbox 202B, opening a port on the sandbox 202B, or otherwise connecting the sandbox 202B to the ephemeral mesh network. In some embodiments, the ephemeral cluster manager 130 may transmit information to the sandboxes 202A and 202B to enable communication between sandboxes, such as an updated list of sandboxes and their ephemeral mesh network addresses. At (11), the ephemeral cluster manager 130 stores the updated ephemeral mesh network information, including the address assigned to the new sandbox 202B, to the ephemeral cluster data store 132.

At (12), the child task 174A executing in the sandbox 202A and the child task 174B executing in the sandbox 202B may communicate with each other via the ephemeral mesh network. Illustratively, the child tasks 174A and 174B may exchange information that enables efficient, low-latency execution of tightly-coupled parallel applications, as described in more detail above. The child tasks 174A and 174B may further communicate with other child tasks via the ephemeral mesh network, and may communicate with the parent process 174 via an API or other interface provided by the frontend 120 or another component of the serverless computing system 110.

It will be understood that FIG. 2B is provided for purposes of example, and that many variations on the depicted interactions are within the scope of the present disclosure. For example, the interactions at (6), (7), (8), (9), (10), and (11) may be carried out prior to or in parallel with the interactions at (4) and (5). As a further example, the ephemeral cluster manager 130 may generate an ephemeral mesh network rather than obtaining an existing ephemeral mesh network (e.g., if creation of the ephemeral mesh network was deferred until it had at least two participants), and may add both of the child tasks 174A and 174B to the ephemeral mesh network. FIG. 2B is thus understood to be illustrative and not limiting.

Figure 3A:
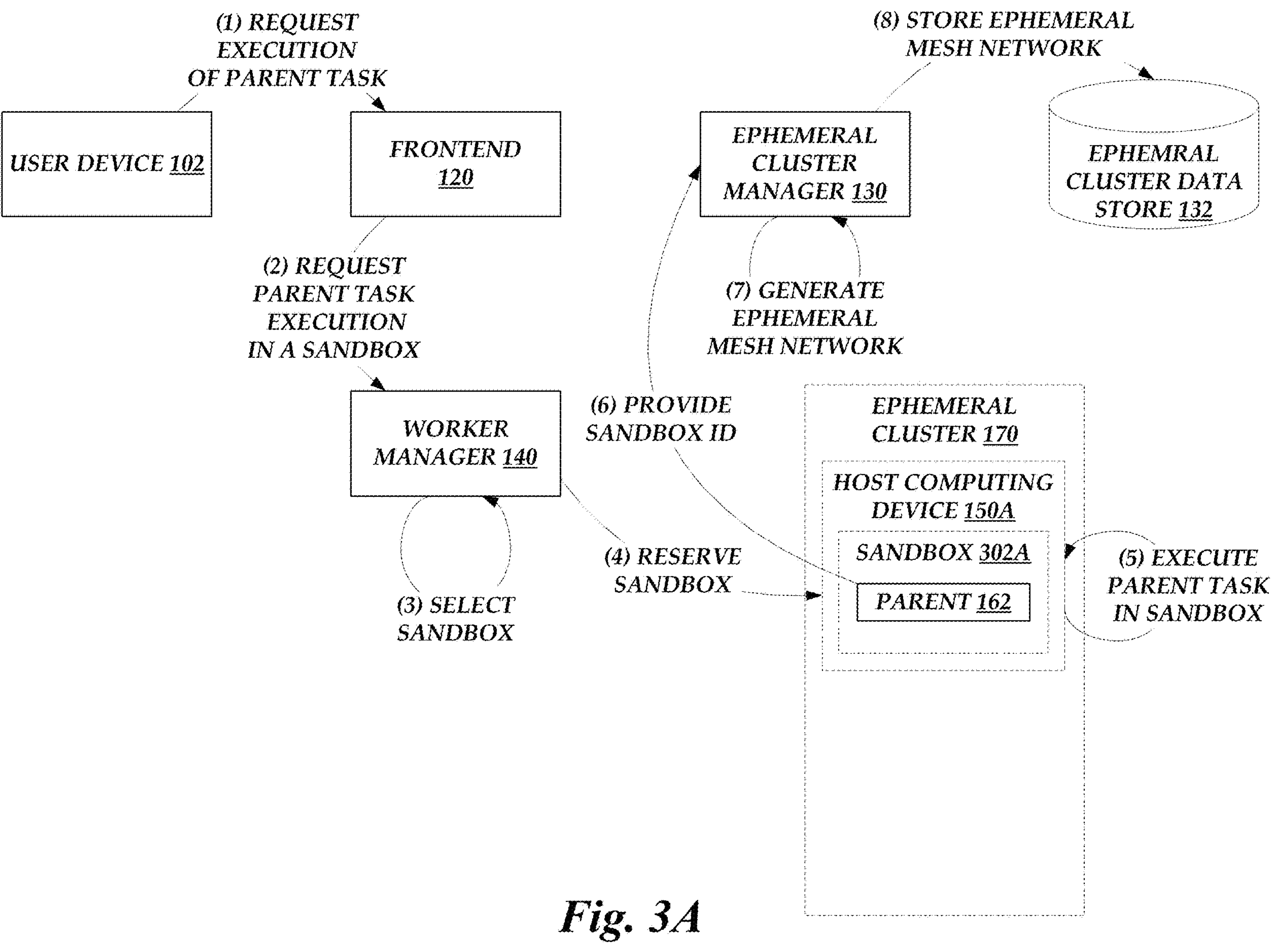
FIGS. 3A and 3B are flow diagrams depicting example interactions for creating and maintaining ephemeral clusters of sandboxed computing environments in a serverless computing system, and creating and maintaining ephemeral mesh networks between the sandboxed computing environments, by providing a mechanism for a parent task executing on the serverless computing system to create child tasks in accordance with aspects of the present disclosure.
Figure 3B:
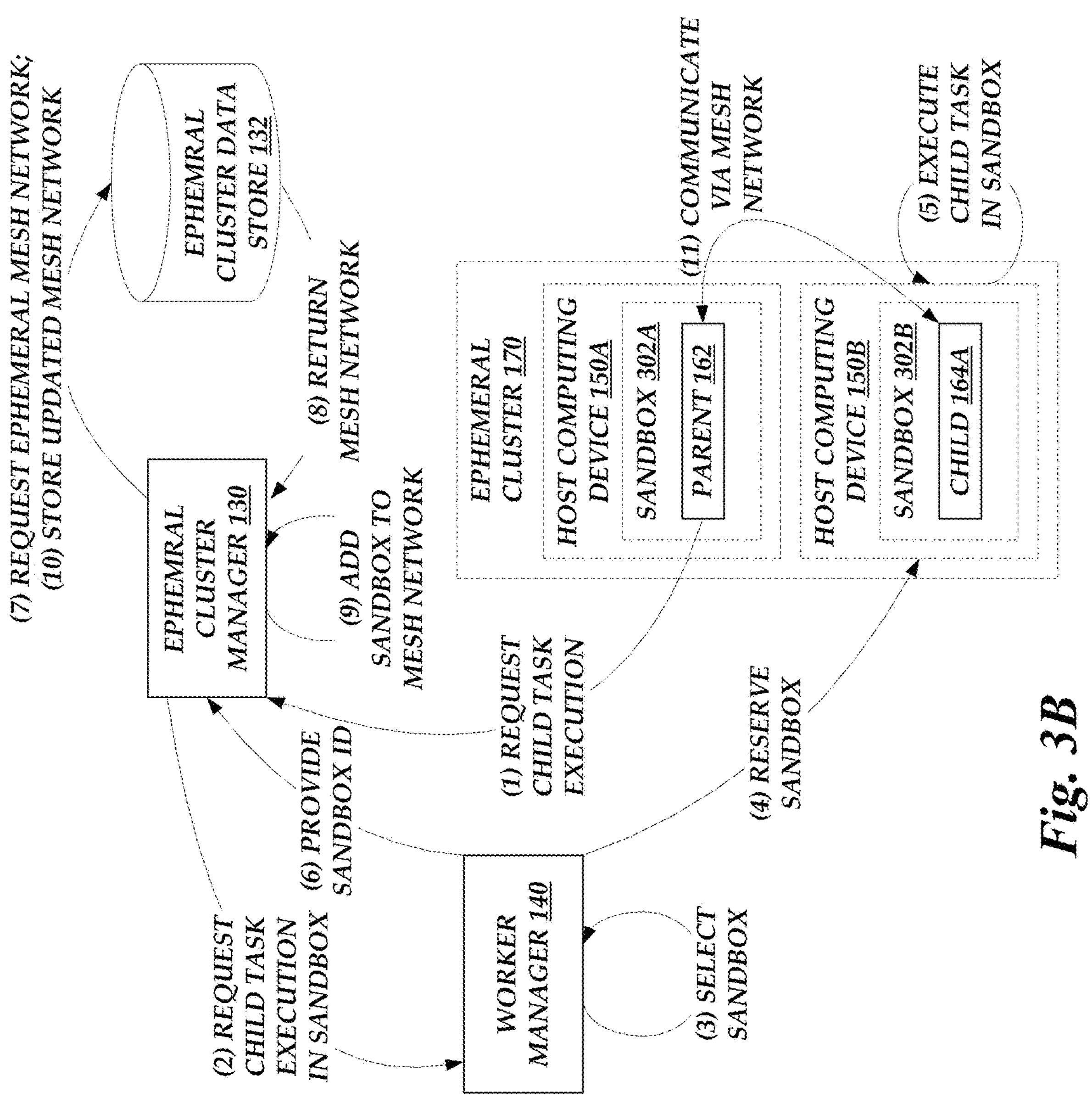

FIGS. 3A and 3B are flow diagrams depicting example interactions for creating and maintaining ephemeral clusters of sandboxed computing environments in a serverless computing system, and creating and maintaining ephemeral mesh networks between the sandboxed computing environments, by providing a mechanism for a parent task executing on the serverless computing system to create child tasks in accordance with aspects of the present disclosure. As discussed above, the example interactions may allow a serverless computing environment to support faster and more efficient execution of closely coupled parallel computing tasks, by enabling communication between sandboxed environments within the serverless computing environment and removing the need for these tasks to communicate indirectly by sending messages to an external server. With reference now to FIG. 3A, at (1), a user device 102 may transmit a request to execute a parent task 162 on a serverless computing system (e.g., the serverless computing system 110 depicted in FIG. 1B) to a frontend 120 of the serverless computing system. As discussed above, the request may be sent via an API or other interface of the frontend 120. In some embodiments, the request may specify that the task 162 is a parent task and therefore will require an ephemeral mesh network. At (2), the frontend 120 passes the request to execute the parent task to a worker manager 140, which at (3) selects (or, in some embodiments, causes the creation of) the sandbox in which the parent task will execute.

At (4), the worker manager 140 reserves (or, in some embodiments, causes a host computing device 150A or a virtual machine instance to create) a sandbox 302A in which the parent task 162 will execute. In various embodiments, as described in more detail above, the sandbox 302A may be a host computing device (e.g., the host computing device 150A), a virtual machine instance (e.g., the virtual machine instance 154A depicted in FIG. 1B), a container on a host computing device or virtual machine instance (e.g., the container 158A depicted in FIG. 1B), or another sandboxed computing environment. At (5), the parent task 162 executes in the sandbox 302A.

At (6), the parent task 162 transmits a sandbox identifier of the sandbox 302A in which it is executing to the ephemeral cluster manager 130. In some embodiments, the sandbox identifier of the sandbox 302A may be used to identify the ephemeral mesh network associated with the parent task 162. In other embodiments, an ephemeral mesh network identifier may be generated from information unique to the executing instance of the parent task 162, information derived from the request transmitted at (1), or other information that corresponds to the parent task 162. Additionally, in some embodiments, the request to execute the parent task 162 may include a request to generate an ephemeral mesh network. In other embodiments, an ephemeral mesh network or an ephemeral cluster may be generated automatically each time the frontend 120 receives a request to execute a task.

At (7), in some embodiments, the ephemeral cluster manager 130 generates an ephemeral mesh network corresponding to the ephemeral mesh network identifier, and connects the sandbox 302A to the ephemeral mesh network. In some embodiments, the ephemeral cluster manager 130 may defer creation of the ephemeral mesh network until at least two entities would be on the network (e.g., until the parent task 162 requests creation of a child task). It will be understood that an ephemeral cluster may, in some embodiments, be defined as the set of sandboxes that are connected to each other by a particular ephemeral mesh network, and thus the ephemeral mesh network identifier may also serve as an ephemeral cluster identifier. In other embodiments, an ephemeral cluster may be defined as a single sandbox 302A that may (or may not) eventually join an ephemeral mesh network and communicate with other sandboxes.

At (8), the ephemeral cluster manager 130 may store information regarding the ephemeral cluster, ephemeral mesh network, and/or the sandbox 302A in an ephemeral cluster data store 132. Such information may include, for example, the ephemeral mesh network identifier, the sandbox identifier, a network address of the identified sandbox 302A, an ephemeral mesh network address assigned to the sandbox 302A, or other such information.

It will be understood that FIG. 3A is provided for purposes of example, and that many variations on the depicted interactions are within the scope of the present disclosure. For example, the interactions at (6), (7), and (8) may be carried out prior to or in parallel with the interactions at (4) and (5). As a further example, the frontend 120 may generate all or part of the ephemeral mesh network identifier upon receiving the request at (1). FIG. 3A is thus understood to be illustrative and not limiting.

With reference now to FIG. 3B, example interactions for processing a request from the parent task 162 to execute an instance of a child task 164A will be described. In some embodiments, the child task 164A may be a duplicate of the parent task 162, and the parent task 162 may specify a function or other entry point into the code of the child task 164A that causes the execution of the child task 164A to differ from the execution of the parent task 162. In other embodiments, the child task 164A may correspond to different executable code than the parent task 162.

At (1), the parent task 162 transmits a request to the ephemeral cluster manager 130 to execute an instance of a child task on the serverless computing system 110, and at (2) the ephemeral cluster manager 130 forwards this request to the worker manager 140. The interactions at (3), (4), and (5) are thus similar to the corresponding interactions (2), (3), and (4) depicted in FIG. 3A but with a different sandbox 302B selected and used, and the descriptions of these interactions are not repeated in the interests of brevity. At (6), the worker manager 140 provides the sandbox identifier of the newly assigned sandbox 302B to the ephemeral cluster manager 130. In some embodiments, as discussed above, each parent task 162 may be associated with a unique ephemeral mesh network identifier, which may be generated automatically when the request to execute a parent task is received. In other embodiments, the ephemeral mesh network identifier may be generated in response to the request to execute a child task or when the parent task 162 registers its sandbox 302A with the ephemeral cluster manager 130.

At (7), the ephemeral cluster manager 130 requests information from the ephemeral cluster data store 132 regarding the ephemeral mesh network with the specified identifier. In some embodiments, as discussed above, an ephemeral mesh network may be created in response to the request to execute the parent task, in which case information regarding the already-existing ephemeral mesh network may be returned at (8). The ephemeral cluster manager 130 may then, at (9), add the sandbox 302B to the ephemeral mesh network corresponding to the parent task 162. In other embodiments (not depicted in FIG. 3B), the ephemeral cluster data store 132 may report at (8) that the parent task does not currently have an ephemeral mesh network associated with it, and the ephemeral cluster manager 130 may at (9) create the ephemeral mesh network and add both sandboxes 302A and 302B to the newly created network. At (10), the ephemeral cluster manager 130 stores updated information regarding the ephemeral mesh network and the connected sandboxes 302A and 302B to the ephemeral cluster data store 132.

At (11), the parent task 162 executing in the sandbox 302A and the child task 164A executing in the sandbox 302B may communicate with each other via the ephemeral mesh network. Illustratively, the parent task 162 and the child task 164A may exchange information that enables efficient, low-latency execution of tightly-coupled parallel applications, as described in more detail above. The parent task 162 may also spawn further child tasks, which may communicate with their parent task 162 and sibling tasks via the ephemeral mesh network. The embodiment depicted in FIGS. 3A and 3B thus differs from the embodiment depicted in FIGS. 2A and 2B in that, inter alia, the parent task 162 is on the ephemeral mesh network and can communicate with its child task(s) via that network rather than communicating via the frontend 120. In some embodiments, the parent task 162 may wait until one or more of its child tasks have completed execution before it completes execution.

It will be understood that FIG. 3B is provided for purposes of example, and that many variations on the depicted interactions are within the scope of the present disclosure. For example, the interactions at (6), (7), (8), (9), and (10) may be carried out prior to or in parallel with the interactions at (4) and (5). As a further example, the sandbox 302A and the sandbox 302B may be hosted on different host computing devices. FIG. 3B is thus understood to be illustrative and not limiting.

Figure 4A:
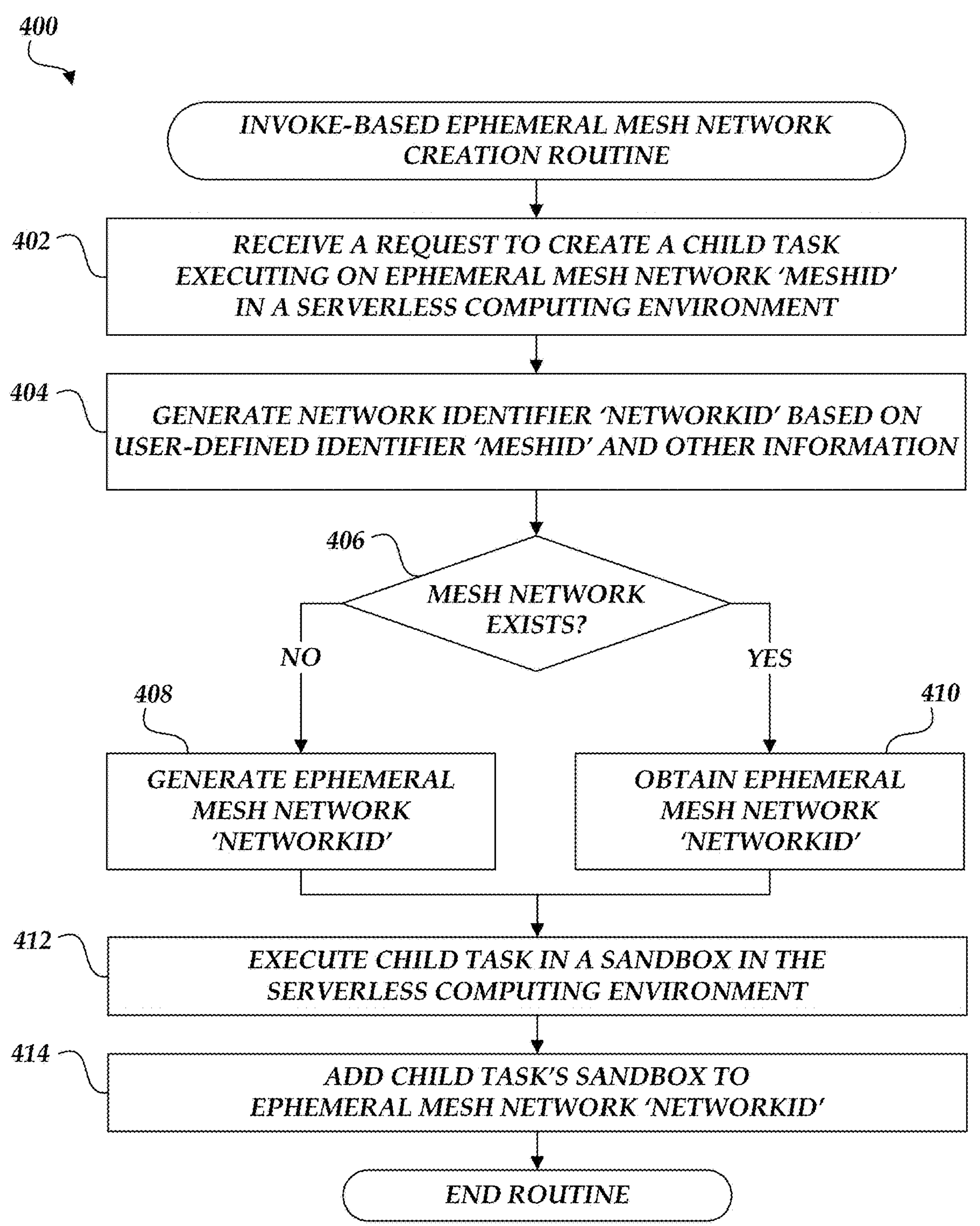
FIG. 4A is a flow chart depicting an example routine for generating and maintaining ephemeral clusters and ephemeral mesh networks by processing calls to a request interface of a serverless computing system in accordance with aspects of the present disclosure.

FIG. 4A is a flow chart depicting an example routine 400 for generating and maintaining ephemeral clusters and ephemeral mesh networks by processing calls to a mesh network creation interface in accordance with aspects of the present disclosure. The routine 400 may be carried out, for example, by the ephemeral cluster manager 130 depicted in FIG. 1B. The routine 400 begins at block 402, where a request may be received to execute an instance of a child task in a serverless computing environment. The request may illustratively be received from a parent or controller process, as discussed in more detail above. The request may include a user-defined mesh network identifier, which as discussed above may be a user-generated string or other identifier of an ephemeral mesh network. For example, the request may specify that the instance of the child task join the ephemeral mesh network associated with the user identifier "abc123." In some embodiments, the user-defined ephemeral mesh network identifier may be omitted and the routine 400 may generate a default ephemeral mesh network identifier based on attributes of the request, the user making the request, or other information.

At block 404, an ephemeral mesh network identifier may be generated based on the user-defined identifier received at block 402 and other information associated with the request (or, in some embodiments, associated with the user making the request). As described in more detail above, the ephemeral mesh network identifier may combine the user-defined identifier with other information in order to prevent user-defined identifiers from inadvertently colliding.

At decision block 406, a determination may be made as to whether an ephemeral mesh network having the identifier generated at block 404 already exists. If not, then at block 408 an ephemeral mesh network with that identifier may be created. Illustratively, the ephemeral mesh network may initially be created as an empty list, and sandboxed computing environments may be added to the list at a later time (e.g., when block 412 of the routine 400 is carried out). In some embodiments, a determination may be made as to whether the ephemeral mesh network would include at least two sandboxed computing environments, and if not then creation of the network may be deferred until it is needed. If the determination at decision block 406 is that an ephemeral mesh network having the specified identifier exists, then the routine 400 instead branches to block 410, where the ephemeral mesh network having the specified identifier may be obtained.

The routine 400 then continues at block 412, where the child task may be executed in a sandboxed computing environment of the serverless computing system. As described in more detail above, a worker manager or other component of the serverless computing system may create a sandboxed computing environment or select an existing sandboxed computing environment in which to execute the instance of the child task. At block 414, the sandboxed computing environment may be added to the ephemeral mesh network that was generated at block 408 or obtained at block 410. Illustratively, the sandboxed computing environment may be added to the ephemeral mesh network by assigning an address on the ephemeral mesh network and establishing a route or routes between the newly added sandbox and the other participants in the ephemeral mesh network. Host computing devices and/or virtual machine instances may encapsulate traffic between sandboxes using, for example, GENEVE tunnels or other encapsulation techniques, and may generate a mapping table for each sandboxed computing environment that translates addresses on the ephemeral mesh network to network addresses of devices or instances in the serverless computing environment.

It will be understood that FIG. 4A is provided for purposes of example, and that many variations on the illustrated routine 400 are within the scope of the present disclosure. For example, the determination at decision block 404 may be as to whether the request received at block 402 is the first request (or the second request) received with the specified mesh network identifier. As a further example, block 414 may be carried out prior to or in parallel with causing the child task to begin executing in the sandbox. FIG. 4A is thus understood to be illustrative and not limiting.

Figure 4B:
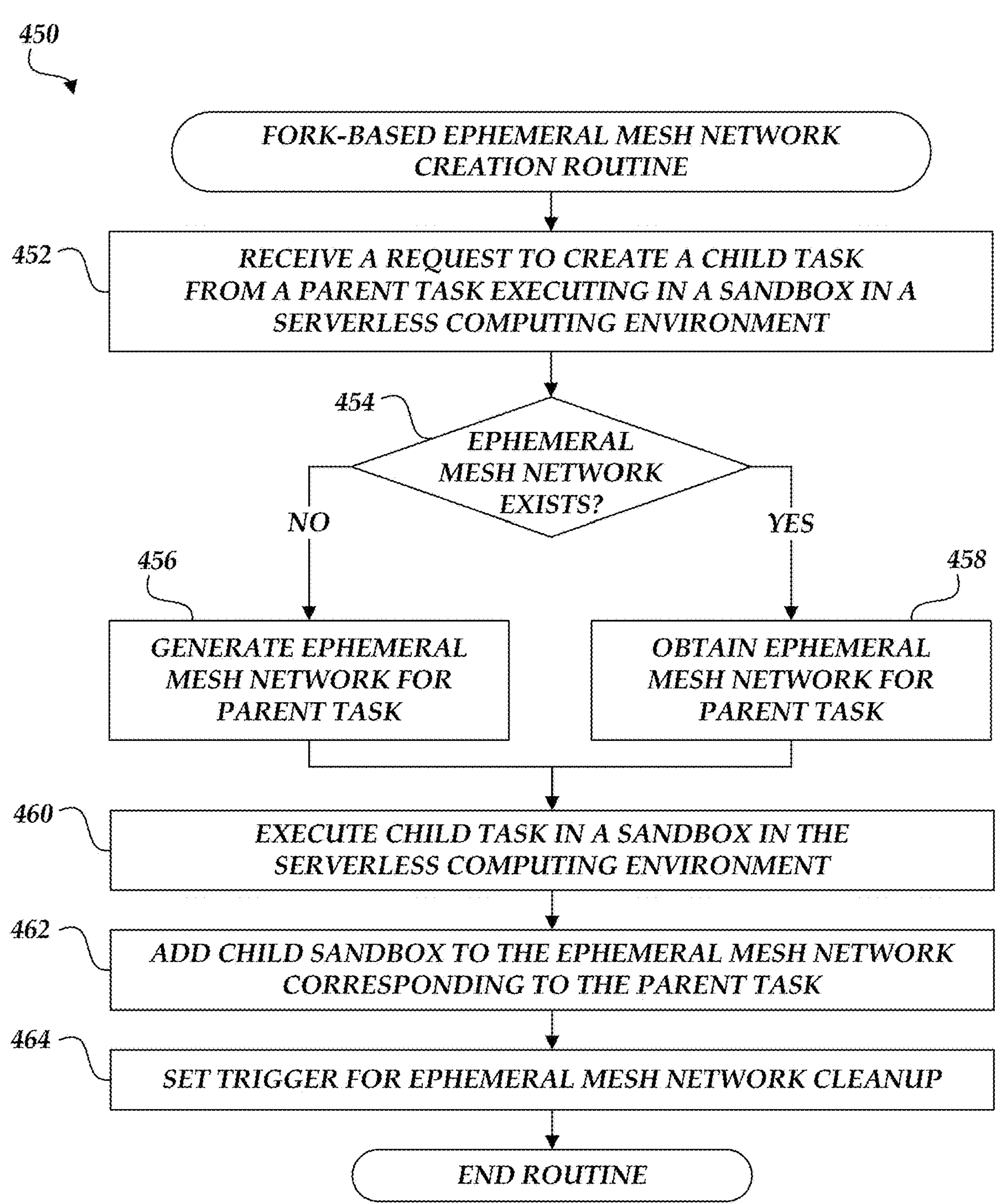
FIG. 4B is a flow chart depicting an example routine for generating and maintaining ephemeral clusters and ephemeral mesh networks by processing requests from tasks executing in a serverless computing environment in accordance with aspects of the present disclosure.

FIG. 4B is a flowchart depicting an example routine 450 for generating and maintaining ephemeral clusters and ephemeral mesh networks by processing requests from tasks executing in a serverless computing environment in accordance with aspects of the present disclosure. The routine 450 may be carried out, for example, by the ephemeral cluster manager 130 depicted in FIG. 1B. The routine 450 begins at block 452, where a request may be received from a parent task executing in a container in a serverless computing environment. The parent task may illustratively be any task executing on a serverless computing system that requests creation of a child task. In some embodiments, the parent task may be the child of a "grandparent" task, and may be requesting creation of a "grandchild" task at block 452.

At decision block 454, a determination may be made as to whether there is an existing ephemeral mesh network that corresponds to the parent task. For example, an ephemeral mesh network corresponding to the parent task may have been generated by a previous execution of the routine 450. In some embodiments, the determination may be as to whether the parent task has previously created any child tasks. In other embodiments, a corresponding ephemeral mesh network may be created when a request to execute the parent task is received, in which case decision block 454 and block 456 may be omitted. If the determination at decision block 454 is that there is not an existing ephemeral mesh network corresponding to the parent task, then at block 456 an ephemeral mesh network may be created and the container in which the parent task is executing may be added to the network. If instead the determination at decision block 454 is that an ephemeral mesh network exists for the parent task, then at block 458 the ephemeral mesh network may be obtained. Thereafter, at block 460, an instance of the child task may be executed in a container in the serverless computing environment, as described in more detail above. At block 462, the container in which the child task is executing may be added to the ephemeral mesh network, as described above.

Figure 5:
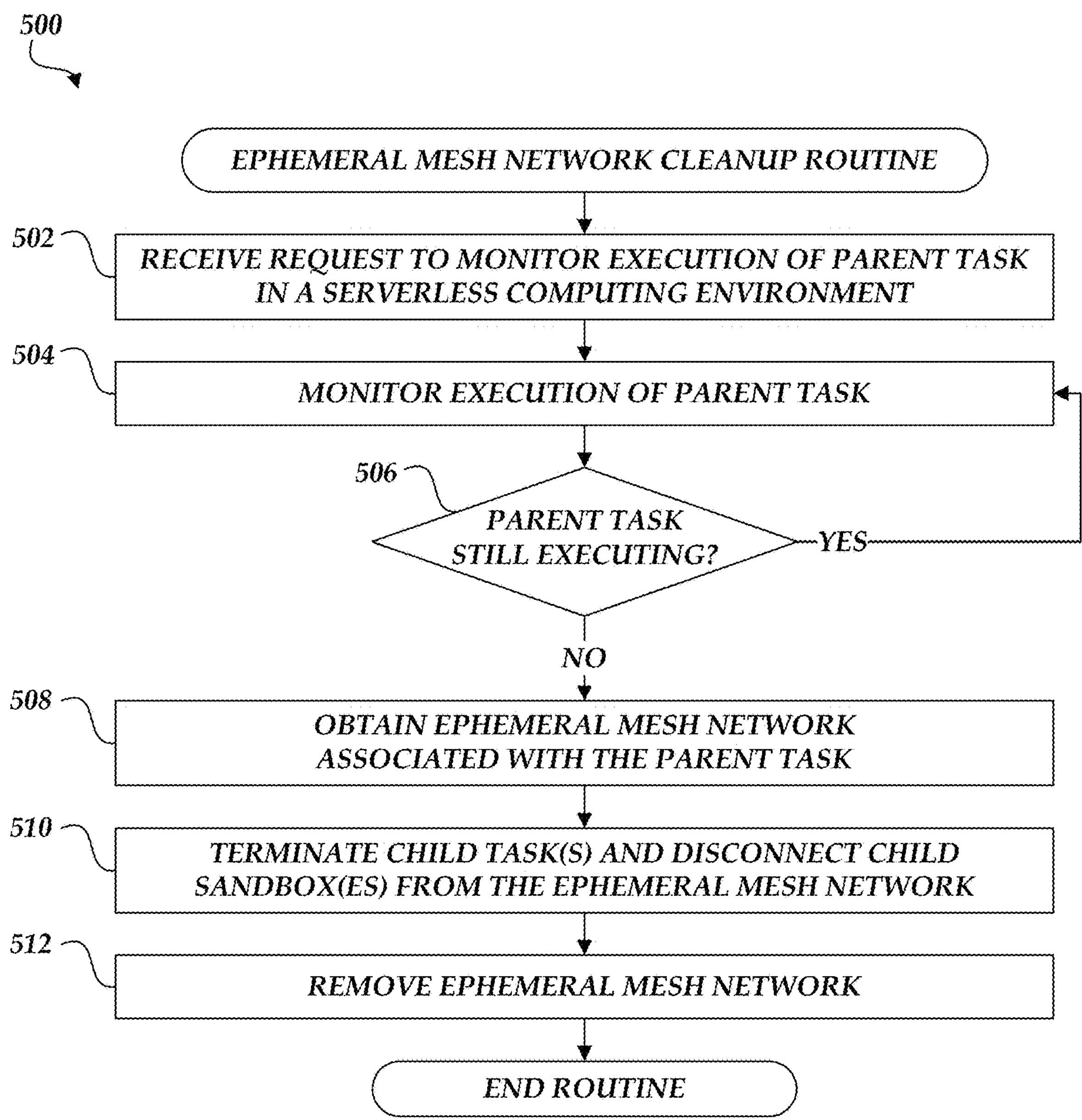
FIG. 5 is a flow chart depicting an example routine for removing an ephemeral mesh network when an associated parent task ceases execution in accordance with aspects of the present disclosure.

At block 464, in some embodiments, the routine 450 may set a triggering event for removal of the ephemeral mesh network (e.g., by carrying out a routine such as the routine 500 depicted in FIG. 5) in order to ensure that the ephemeral mesh network corresponding to the parent task is removed. In some embodiments, as described in more detail below, the triggering event may be that the parent task has ceased execution, and the routine 450 may thus initiate monitoring execution of the parent task. In other embodiments, the triggering event may be garbage collection of the parent task, an amount of elapsed time since the parent task began executing, or another criterion for removing the ephemeral mesh network. In further embodiments, monitoring execution of the parent task may include monitoring execution of the individual child tasks and removing their sandboxes from the ephemeral mesh network if and when they cease execution.

It will be understood that FIG. 4B is provided for purposes of example, and that many variations on the illustrated routine 450 are within the scope of the present disclosure. For example, block 460 may be carried out prior to or in parallel with obtaining or generating the ephemeral mesh network. As a further example, the determination at decision block 454 may be as to whether an attempt to obtain an existing ephemeral mesh network succeeded. FIG. 4A is thus understood to be illustrative and not limiting.

FIG. 5 is a flowchart depicting an example routine 500 for monitoring execution of a parent task and cleaning up its ephemeral mesh network in accordance with aspects of the present disclosure. The routine 500 may be carried out, for example, by the ephemeral cluster manager 130 depicted in FIG. 1B. The routine 500 begins at block 502, where a request may be received to monitor execution of a parent task (e.g., one that has requested execution of child tasks) in a serverless computing environment. The request may be received, for example, from the routine 450 depicted in FIG. 4B. In some embodiments, the routine 500 may be carried out automatically by a serverless computing system whenever an ephemeral mesh network is created. At block 504, the routine 500 may begin monitoring execution of the parent task. Monitoring the execution of the parent task may illustratively include internal or external monitoring of the sandboxed computing environment in which the parent task is executing. For example, the routine 500 may monitor a "heartbeat," CPU usage, memory usage, or other measure of activity by the parent task. In some embodiments, as discussed above, the routine 500 may instead monitor whether a garbage collection process has collected the parent task.

At decision block 506, a determination may be made as to whether the parent task is still executing (or, in some embodiments, whether the parent task has been garbage collected). In various embodiments, decision block 506 may be carried out on a periodic basis, in response to various events (e.g., receiving a message or output from the parent task, CPU usage falling below a threshold, detecting an indication that the parent task may have been terminated or garbage collected, etc.), or in accordance with other criteria. In some embodiments, a determination may be made as to whether a duration of execution of the parent task has exceeded a threshold, such as an upper limit on how long tasks may execute in the serverless computing environment. If the determination at decision block 506 is that the parent task is still executing, then the routine 500 branches to block 504 and continues monitoring execution of the parent task until it is no longer executing.

If the determination at decision block 506 is that the parent task is no longer executing, then at block 508 an ephemeral mesh network associated with the parent task may be obtained. In some embodiments, there may be a single ephemeral mesh network that corresponds to the parent task and is identified by an identifier unique to the parent task. In other embodiments, there may be multiple ephemeral mesh networks associated with the parent task, and these networks may be obtained iteratively until no further ephemeral mesh networks remain that are associated with the parent task. At block 510, any child tasks on the ephemeral mesh network are terminated and their sandboxes are disconnected from the ephemeral mesh network. At block 512, the sandbox in which the parent task executed is disconnected from the ephemeral mesh network, leaving no entities on the network, and the ephemeral mesh network is removed (e.g., from the data store from which it was obtained).

It will be understood that FIG. 5 is provided for purposes of example, and that many variations on the illustrated routine 500 are within the scope of the present disclosure. For example, blocks 508, 512, and 512 of the routine 500 may be carried out by the serverless computing system as part of a post-execution cleanup of the sandboxed computing environment associated with the parent task, rather than carrying out a separate routine that monitors execution of the parent task. As a further example, the routine 500 may receive a signal indicating that a parent task has ceased execution rather than receiving a request to monitor execution of a parent task. FIG. 5 is thus understood to be illustrative and not limiting.

Figure 6:
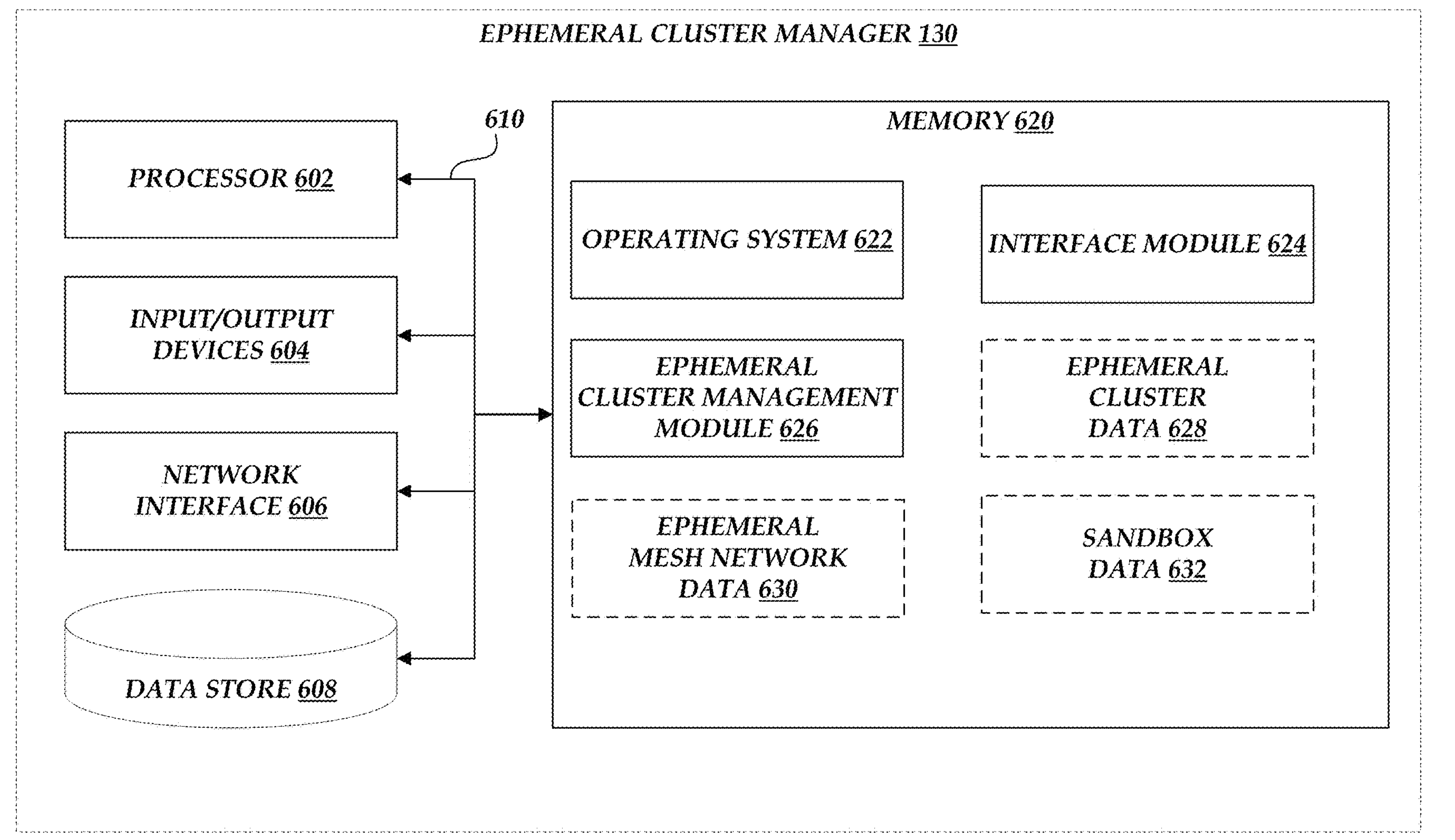
FIG. 6 is a block diagram depicting a general architecture of a computing device that is configured to manage ephemeral clusters and ephemeral mesh networks in accordance with aspects of the present disclosure.

FIG. 6 depicts a general architecture of a computing system (referenced as ephemeral cluster manager 130) that operates to manage ephemeral clusters and ephemeral mesh networks within the on-demand code execution system 110. The general architecture of the ephemeral cluster manager 130 depicted in FIG. 6 includes an arrangement of computer hardware and software modules that may be used to implement aspects of the present disclosure. The hardware modules may be implemented with physical electronic devices, as discussed in greater detail below. The ephemeral cluster manager 130 may include many more (or fewer) elements than those shown in FIG. 6. It is not necessary, however, that all of these generally conventional elements be shown in order to provide an enabling disclosure. Additionally, the general architecture illustrated in FIG. 6 may be used to implement one or more of the other components illustrated in FIGS. 1A-B. As illustrated, the ephemeral cluster manager 130 includes a processor 602, input/output device interfaces 604, a network interface 606, and a data store 608, all of which may communicate with one another by way of a communication bus 610. The network interface 606 may provide connectivity to one or more networks or computing systems, such as user devices 102, auxiliary services 106, data storage services 108, or other components of the serverless computing system 110. The processor 602 may thus receive information and instructions from other computing systems or services via the network 104. The processor 602 may also communicate to and from a memory 620 and further provide output information for an optional display (not shown) via the input/output device interfaces 604. The input/output device interfaces 604 may also accept input from an optional input device (not shown).

The memory 620 may contain computer program instructions (grouped as modules in some embodiments) that the processor 602 executes in order to implement one or more aspects of the present disclosure. The memory 620 generally includes random access memory (RAM), read only memory (ROM) and/or other persistent, auxiliary or non-transitory computer readable media. The memory 620 may store an operating system 622 that provides computer program instructions for use by the processor 602 in the general administration and operation of the ephemeral cluster manager 130. The memory 620 may further include computer program instructions and other information for implementing aspects of the present disclosure. For example, in one embodiment, the memory 620 includes an interface module 624 that generates interfaces (and/or instructions therefor) for interacting with the frontends 120, worker managers 140, or other computing devices, e.g., via an API, CLI, and/or Web interface. In addition, the memory 620 may include and/or communicate with one or more data repositories (not shown), for example, to access user program codes and/or libraries.

In addition to and/or in combination with the interface module 624, the memory 620 may include a ephemeral cluster management module 626 that may be executed by the processor 602. In one embodiment, ephemeral cluster management module 626 implements various aspects of the present disclosure, e.g., generating and managing ephemeral clusters and ephemeral mesh networks, as described further above. While the ephemeral cluster management module 626 is shown in FIG. 6 as part of the ephemeral cluster manager 130, in other embodiments, all or a portion of the ephemeral cluster management module 626 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the ephemeral cluster manager 130.

The memory 620 may further include ephemeral cluster data 628, ephemeral mesh network data 630, and sandbox data 632, which may be loaded into memory in conjunction with generating and maintaining ephemeral clusters and ephemeral mesh networks for the on-demand code execution system 110. In some embodiments, the memory 620 may further include, e.g., information regarding particular host computing devices or virtual machine instances, particular requests to execute child tasks, or other information that is used to generate or maintain ephemeral mesh networks.

In some embodiments, the ephemeral cluster manager 130 may further include components other than those illustrated in FIG. 6. For example, the memory 620 may further include information regarding pending requests to execute child tasks, ephemeral mesh network identifiers, or other information that facilitates managing ephemeral clusters and ephemeral mesh networks. FIG. 6 is thus understood to be illustrative but not limiting.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system comprising:

a data store configured to store computer-executable instructions; and a processor in communication with the data store, wherein the computer-executable instructions, when executed by the processor, configure the processor to perform operations including:

receiving a parent task execution request from an invoking function to execute a parent task on a serverless computing system;

in response to the parent task execution request, causing the parent task to execute in a first sandboxed environment of the serverless computing system;

receiving, from the parent task, a child task execution request to execute a first instance of a child task comprising an invoked function on the serverless computing system; and in response to the child task execution request:

dynamically creating an ephemeral mesh network between the first sandboxed environment and a second sandboxed environment of the serverless computing system, wherein the ephemeral mesh network is an invocation-driven dynamically created temporary and distinct network created to enable bilateral communication between the invoking function and the invoked function within a cluster of associated sandboxed environments comprising the first sandboxed environment and the second sandboxed environment, created in response to the request;

causing the first instance of the child task to execute in the second sandboxed environment;

monitoring execution of the parent task; and in response to a determination that the parent task has ceased executing, removing the ephemeral mesh network between the first sandboxed environment and the second sandboxed environment.

2. The system of claim 1, wherein the parent task execution request specifies an Internet Protocol ("IP") address range for the ephemeral mesh network.

3. The system of claim 2, wherein creating the ephemeral mesh network includes assigning an IP address from the IP address range to at least the second sandboxed environment.

4. The system of claim 1, wherein the data store is configured to store further computer-executable instructions that, when executed by the processor, configure the processor to perform further operations including:

receiving, from the parent task, a second child task execution request to execute a second instance of the child task on the serverless computing system; and in response to the second child task execution request:

updating the ephemeral mesh network to include a third sandboxed environment of the serverless computing system; and causing the second instance of the child task to execute in the third sandboxed environment.

5. The system of claim 4, wherein the data store is configured to store further computer-executable instructions that, when executed by the processor, configure the processor to perform further operations including:

in response to a determination that the second instance of the child task has ceased execution, removing the third sandboxed environment from the ephemeral mesh network.

6. A computer-implemented method comprising:

causing an invoking function of a parent task to execute in a first sandboxed environment of a serverless computing system;

receiving, from the invoking function, a request to execute a first instance of an invoked function in a child task on the serverless computing system;

in response to the request, dynamically creating an ephemeral mesh network between the first sandboxed environment and a second sandboxed environment of the serverless computing system, wherein the ephemeral mesh network is an invocation-driven dynamically created and distinct network created to enable bilateral communication between the invoking function and the invoked function within a cluster of associated sandboxed environments comprising the first sandboxed environment and the second sandboxed environment, temporary, and dynamically created in response to the request;

causing the first instance of the child task to execute in the second sandboxed environment;

monitoring execution of the parent task; and in response to a determination that the parent task has ceased executing, removing the ephemeral mesh network.

7. The computer-implemented method of claim 6 further comprising:

in response to the determination that the parent task has ceased executing, terminating execution of the child task.

8. The computer-implemented method of claim 6, wherein the first instance of the child task communicates with at least one of the parent task or a second instance of the child task via the ephemeral mesh network.

9. The computer-implemented method of claim 6, wherein creating the ephemeral mesh network comprises establishing a connection between a first network interface in the first sandboxed environment and a second network interface in the second sandboxed environment.

10. The computer-implemented method of claim 9 further comprising creating the first network interface and the second network interface.

11. The computer-implemented method of claim 6 further comprising, in response to the determination that the parent task has ceased execution, removing the first sandboxed environment.

12. The computer-implemented method of claim 6, wherein the parent task waits for at least one instance of the child task to complete execution before the parent task completes execution.

13. The computer-implemented method of claim 6, wherein the parent task is associated with a unique ephemeral mesh network identifier.

14. The computer-implemented method of claim 6, wherein the first sandboxed environment is on a different host computing device than the second sandboxed environment.

15. The computer-implemented method of claim 6, wherein the first sandboxed computing environment comprises one or more of a host computing device, a virtual machine instance, or a container.

16. A computer-implemented method comprising:

receiving, from an invoking function of a parent task executing in a first sandboxed environment of a serverless computing system, a request to execute a first instance of an invoked function in a child task on the serverless computing system;

in response to the request, dynamically creating an ephemeral mesh network between the first sandboxed environment and a second sandboxed environment of the serverless computing system, wherein the ephemeral mesh network is an invocation-driven dynamically created and distinct network created to enable bilateral communication within a cluster of associated sandboxed environments comprising the first sandboxed environment and the second sandboxed environment, temporary, and dynamically created in response to the request; and causing the first instance of the child task to execute in the second sandboxed environment.

17. The computer-implemented method of claim 16, further comprising in response to a determination that the parent task has ceased executing, removing the ephemeral mesh network.

18. The computer-implemented method of claim 16, wherein the child task is a first child task, and wherein the method further comprises receiving, from the parent task, a request to execute a first instance of a second child task on the serverless computing system.

19. The computer-implemented method of claim 18, further comprising:

in response to the request to execute the first instance of the second child task on the serverless computing system:

updating the ephemeral mesh network to include a third sandboxed environment of the serverless computing system; and causing the first instance of the second child task to execute in the third sandboxed environment.

20. The computer-implemented method of claim 18, further comprising:

in response to the request to execute the first instance of the second child task on the serverless computing system:

creating a second ephemeral mesh network between the first sandboxed environment and a third sandboxed environment of the serverless computing system; and causing the first instance of the second child task to execute in the third sandboxed environment.

21. The system of claim 1, wherein the cluster of associated sandboxed environments consists of the first sandboxed environment and the second sandboxed environment.

22. The system of claim 1, wherein the system comprises a first network, and wherein the dynamically creating the ephemeral mesh network comprises configuring the first network to enable communication within the cluster of associated sandboxed environments via the ephemeral mesh network isolated from other communication on the first network.

* * * * *